United States Patent
Iida et al.

(10) Patent No.: US 7,059,929 B2
(45) Date of Patent: Jun. 13, 2006

(54) ARC TUBE MANUFACTURING METHOD THAT REDUCES UNEVENNESS IN THICKNESS OF A PHOSPHOR LAYER ON AN INNER SURFACE OF A BENT GLASS TUBE

(75) Inventors: Shiro Iida, Kyoto (JP); Toyokazu Amano, Nagaokakyo (JP); Kenji Itaya, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 368 days.

(21) Appl. No.: 10/762,986

(22) Filed: Jan. 21, 2004

(65) Prior Publication Data

US 2004/0214500 A1 Oct. 28, 2004

(30) Foreign Application Priority Data

Jan. 28, 2003 (JP) .............................. 2003-019296

(51) Int. Cl.
*H01J 9/00* (2006.01)
*H01J 9/22* (2006.01)

(52) U.S. Cl. .............................. 445/26; 427/64; 445/22
(58) Field of Classification Search .................. 445/22, 445/26, 27; 427/64–73; 313/485–487
See application file for complete search history.

(56) References Cited

U.S. PATENT DOCUMENTS 2,901,375 A * 8/1959 Patterson et al. ............. 427/67
2004/0145319 A1 * 7/2004 Fujiwara et al. ............ 313/634

FOREIGN PATENT DOCUMENTS

JP 10/50259 2/1998

\* cited by examiner

*Primary Examiner*—Joseph Williams

(57) ABSTRACT

A compact self-ballasted fluorescent lamp includes an arc tube in which a phosphor layer is formed on an inner surface of a double spiral glass tube formed into a double spiral. The phosphor layer is formed by a process of injecting a suspension for forming the phosphor layer into the double spiral glass tube; a process of coating the inner surface of the double spiral glass tube with the suspension; a process of draining the suspension from the double spiral glass tube; a process of preliminarily drying the suspension until the suspension do longer flows according to self weight, while rotating the double spiral glass tube in a state in which a spiral axis of the double spiral glass tube is at an angle of 100 degrees with respect to a vertical axis and a turning part of the double spiral glass tube is downward; and process of completely drying the partially dried double spiral glass tube.

15 Claims, 19 Drawing Sheets

FIG.6
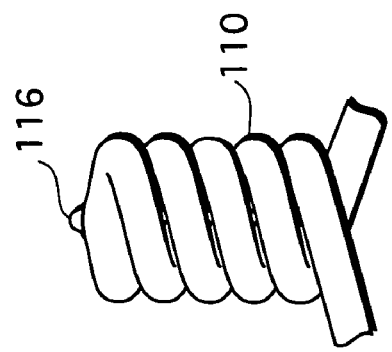
(c)
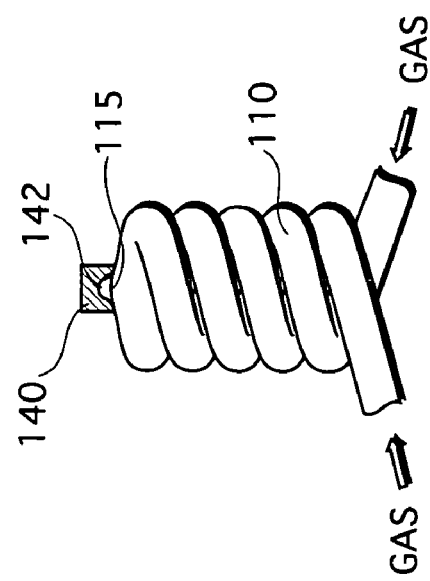
(b)
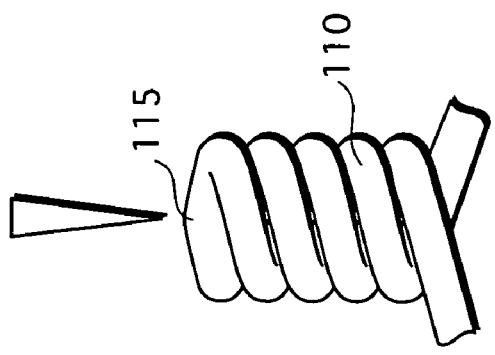
(a)

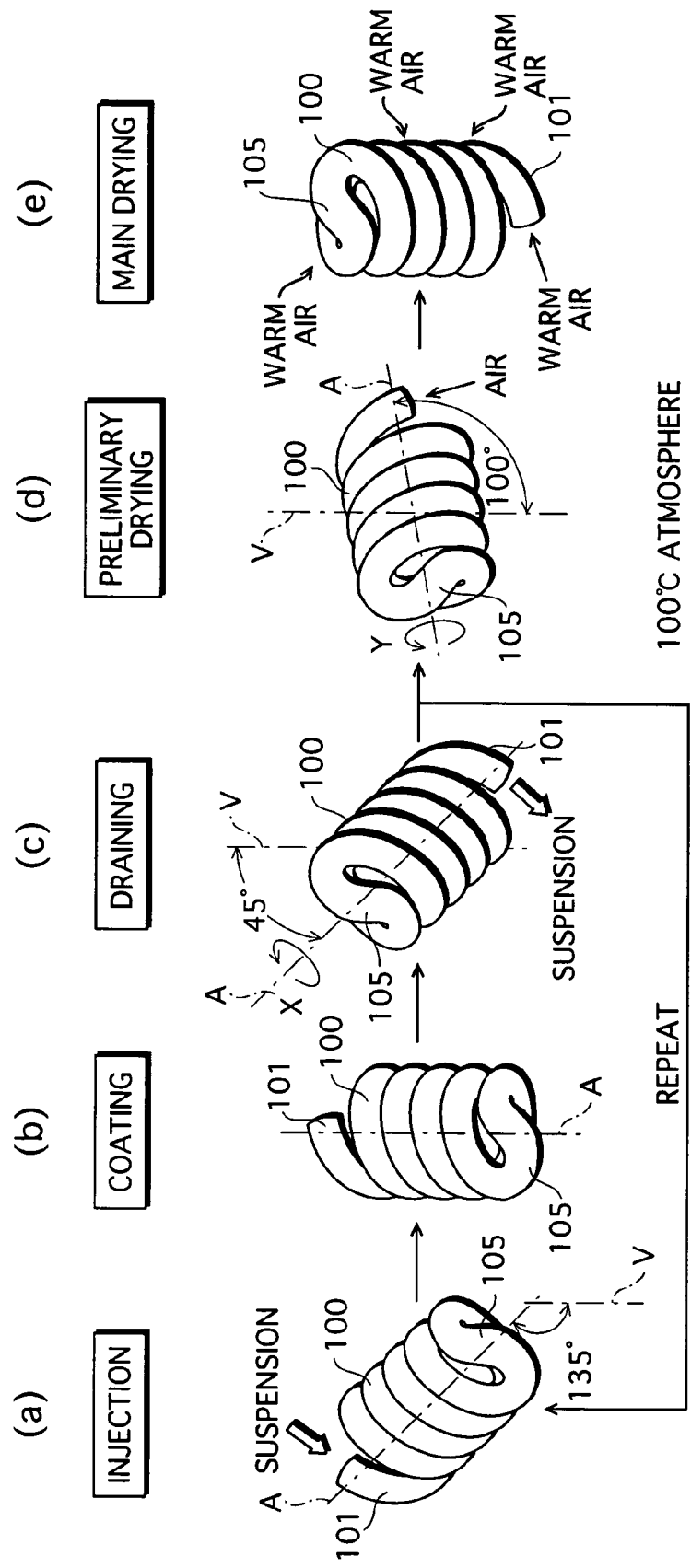

O - O CROSS SECTION

FIG.10

(UNIT:mg/cm$^2$)

| n POSITION | INSIDE (Pnb) | OUTSIDE (Pna) |
|---|---|---|
| 1 | 4.1 | 6.5 |
| 2 | 5.7 | 4.8 |
| 3 | 5.7 | 8.4 |
| 4 | 7.5 | 5.4 |

FIG.12

(UNIT:mg/cm²)

| POSITION n | TOP SIDE (Pnc) | BASE SIDE (Pnd) |
|---|---|---|
| 1 | 6.6 | 9.1 |
| 2 | 6.7 | 11.1 |
| 3 | 5.8 | 13.2 |
| 4 | 4.6 | 19.2 |

ARC TUBE MANUFACTURING METHOD THAT REDUCES UNEVENNESS IN THICKNESS OF A PHOSPHOR LAYER ON AN INNER SURFACE OF A BENT GLASS TUBE

This application is based on application No. 2003-19296 filed in Japan, the contents of which are hereby incorporated by reference.

BACKGROUND OF THE INVENTION (1) Field of the Invention

The present invention relates to a manufacturing method for an arc tube in which a glass tube is turned to form a turning part therein and is spirally wound from the turning part to at least one end part in a first direction to form a bent glass tube, and in which a phosphor layer is formed on an inner surface of the bent glass tube.

(2) Description of the Related Art

In this age of energy conservation, compact self-ballasted fluorescent lamps that are highly lamp efficient and have a long life are being proposed as light sources in place of common incandescent lamps. As such a compact self-ballasted fluorescent lamp, inventors are investigating the use of arc tubes formed in a double spiral by turning a glass tube in substantially a center thereof, and winding both ends thereof on a predetermined axis (hereinafter called a "spiral axis") (see Japanese Laid-Open Patent Nos. 8-339780 and 9-17378).

The reason for such investigations into the use of arc tubes with a double spiral shape is that this kind of arc tube has a longer discharge path than a so-called three-U shape that consists of three U-shaped glass tubes joined together, even when housed in the same capacity.

The glass tube that has been formed into a double spiral shape and that composes an arc tube is called "double spiral glass tube". A phosphor layer is formed on the inner surface of the double spiral glass tube. FIG. 1 shows a method for forming the phosphor layer on the inner surface of a double spiral glass tube 509. The following describes a conventional phosphor layer formation method with use of FIG. 1.

First, the double spiral glass tube 509 is positioned so that one end faces upward, as shown in FIG. 1(a), and a suspension for forming the phosphor layer is injected into the double spiral glass tube 509 through an end part 591 thereof. Here, the "end parts" of the spiral tube denote the end parts of the glass tube that composes the spiral tube.

When the suspension has been injected, the double spiral glass tube 509 is stood so that the end part 591 is at the top, and the injected suspension flows downward to the end of the double spiral glass tube 509 at which the turning part 592 is formed. Here, the double spiral glass tube 509 is shaken gently so that the suspension coats the entire inside surface while also reaching the turning part 592 quickly.

Next, when the suspension has flowed to the end at which the turning part 592 is formed, the double spiral glass tube 509 is turned upside down as shown in FIG. 1(c), and the suspension drains out due to its own weight. When the suspension has substantially finished draining out, the double spiral glass tube 509 is positioned so that the other end faces upward, suspension is injected through the other end part, and once again the double spiral glass tube 509 is tuned upside down and the suspension is drained (FIGS. 1(a), (b), and (c)).

After having the injected suspension drain from both end parts 591 in this way, the double spiral glass tube 509 is maintained in the standing state such that the turning part 592 is upward, and is subject to an atmosphere of 100° C. while warm air is blown into the double spiral glass tube 509 through the end part 591 as shown in FIG. 1(d). This preliminary drying is performed until the suspension coating the inner surface of the double spiral glass tube 509 loses fluidity. Finally, the suspension is dried completely by placing the double spiral glass tube 509 in a drying oven for eight minutes at 45° C. as shown in FIG. 1(e). The described processes result in a phosphor layer being formed on the inner surface of the double spiral glass tube 509.

In this conventional method, the suspension in the double spiral glass tube 509 is dried after being drained, while the double spiral glass tube 509 is standing. For this reason, the suspension in the spiraling parts of the double spiral glass tube 509 flows downward from the top side of the surface in a cross section. Accordingly, in the cross section of the double spiral glass tube 509, the phosphor layer is formed thinly on the surface on the top side and thickly on the surface on the bottom side (hereinafter, parts where the phosphor layer is formed thickly are referred to as "thickly-formed parts".

FIG. 2 shows a lamp that uses an arc tube manufactured according to the above-described conventional manufacturing method, during illumination. Since visible light excited in the phosphor layer is unable to pass through the thickly-formed parts in the lamp that uses the conventional arc tube, the thickly-formed parts are darker than other parts, and appear as bands of shadow shown by hatching in FIG. 2. This is not a problem if a globe is provided to cover the arc tube because the arc tube is not visible from outside the glove. However, such dark parts are undesirable in terms of design in a lamp that does not have a globe because they are visible.

SUMMARY OF THE INVENTION

In view of the stated problem, the object of the present invention is to provide an arc tube manufacturing method that is able to reduce inconsistencies in the thickness of the phosphor layer on the inner surface of the bent glass tube that composes the arc tube.

In order to achieve the stated object, the present invention is a manufacturing method for an arc tube in which a phosphor layer is formed on an inner surface of a bent glass tube, including: a formation process of turning a glass tube to form a turning part therein, and winding the glass tube, from the turning part to at least one end of the glass tube, on a predetermined axis in a first direction, thereby forming the bent glass tube; a coating process of coating the inner surface of the bend glass with a phosphor suspension; and a preliminary drying process of drying the phosphor suspension that coats the inner surface, while rotating the bent glass tube on the axis in a second direction that is opposite to the first direction, with the bent glass tube in an inclined state such that the axis is inclined with respect to a vertical direction.

According to the stated method, suspension is prevented from remaining in particular parts inside the bent glass tube. This reduces inconsistencies in the thickness of the phosphor layer.

Here, the bent glass tube being "in an inclined state" does not limit the bent glass tube to being inclined at one particular angle, but includes the concept of inclination at a plurality of different angles. Furthermore, "rotating the bent glass tube" does not limit the bent glass tube to being rotated at one particular speed, but includes the concept of rotating the glass tube at a plurality of different speeds.

Furthermore, in the preliminary drying process, the suspension may be dried until the suspension no longer flows according to self weight.

According to the stated method, the bent glass tube is rotated until the suspension loses fluidity, and the suspension is dried while being moved about. This prevents the suspension from accumulating in particular places, and enables relatively little inconsistency in the thickness of the phosphor layer.

In particular, in the preliminary drying process the bent glass tube may be inclined such that an angle between the axis and the vertical direction is in a range of 45 degrees to 150 degrees inclusive.

If the bent glass tube is inclined at an angle within this range and rotated, the suspension moves about within a large area in the bent glass tube, the phosphor layer can be formed with relatively little inconsistency in thickness.

On the other hand, the glass tube may be wound, from the turning part to each end, on the axis in the first direction, thereby forming the bent glass tube having a double spiral shape.

For this reason, the suspension can coat the inside of the double-spiral bent glass tube without inconsistency, by rotating the bent glass tube in a direction opposite to the first direction.

Furthermore, in the preliminary drying process the bent glass tube may be inclined such that an angle between the axis and the vertical direction is in a range of 90 degrees to 150 degrees inclusive.

By inclining the bent glass tube at an angle within this range, the suspension in the bent glass tube flows to the turning part, and the phosphor layer in the turning part can be formed with relatively little inconsistency in thickness.

Furthermore, the suspension may have a viscosity in a range of $3.0*10^{-3}$ Pas to $5.0*10^{-3}$ Pas inclusive.

By using suspension with a viscosity within this range, the suspension moves about within a large area in the bent glass tube, and the phosphor layer can be formed with relatively little inconsistency in thickness.

Furthermore, the bent glass tube may be rotated in a range of 2 rotations/min to 20 rotations/min inclusive.

By rotating the bent glass tube at a speed within this range, the suspension moves about smoothly in the bent glass tube, and coats a large area. This enables the phosphor layer to be formed with relatively little inconsistency in thickness.

Furthermore, when the suspension is being injected into the bent glass tube, a temperature of an outer surface of the glass tube may be in a range of 30° C. to 60° C. inclusive.

The outside surface temperature of the bent glass tube within this range improves wettability between the inner surface of the bent glass tube and the suspension.

On the other hand, a draining process may be performed before the preliminary drying process, the draining process being for draining the suspension out from the bent glass tube through an end part thereof by gravity.

In particular, in the draining process the bent glass tube may rotated at a speed in a range of 2 rotations/min to 20 rotations/min, an axis of rotation being the spiral axis.

According to the stated method, the suspension is discharged efficiently from the bent glass tube.

Furthermore, in the draining process the bent glass tube may be rotated for at least 15 seconds and no more than 60 seconds from when draining of the suspension is commenced.

According to the stated method, the suspension is discharged efficiently from the bent glass tube.

Furthermore, in the draining process the bent glass tube may be rotated inclined with respect to the vertical direction. In addition, the bent glass tube maybe inclined at an angle in a range of 5 degrees to 90 degrees inclusive.

According to the stated method, the suspension is discharged while coating a large area of the bent glass tube.

The suspension may be water based, and include phosphor for three bands. Alternatively, the suspension may be butyl acetate based, and include phosphor for three bands.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 6 shows a process for forming a protrusion in the double spiral glass tube in the first manufacturing method;

FIG. 7 shows a process for forming a phosphor layer in a double spiral glass tube in the first manufacturing method;

FIG. 10 shows results of measuring the thickness of the phosphor layer in the measurement positions show in FIG. 9;

FIG. 12 shows results of measuring the thickness of the phosphor layer in the measurement positions showing in FIG. 11;

DESCRIPTION OF THE PREFERRED EMBODIMENT

The following describes an embodiment of the compact self-ballasted fluorescent lamp of the present invention, with reference to the drawings.

First Embodiment

Figure 3:
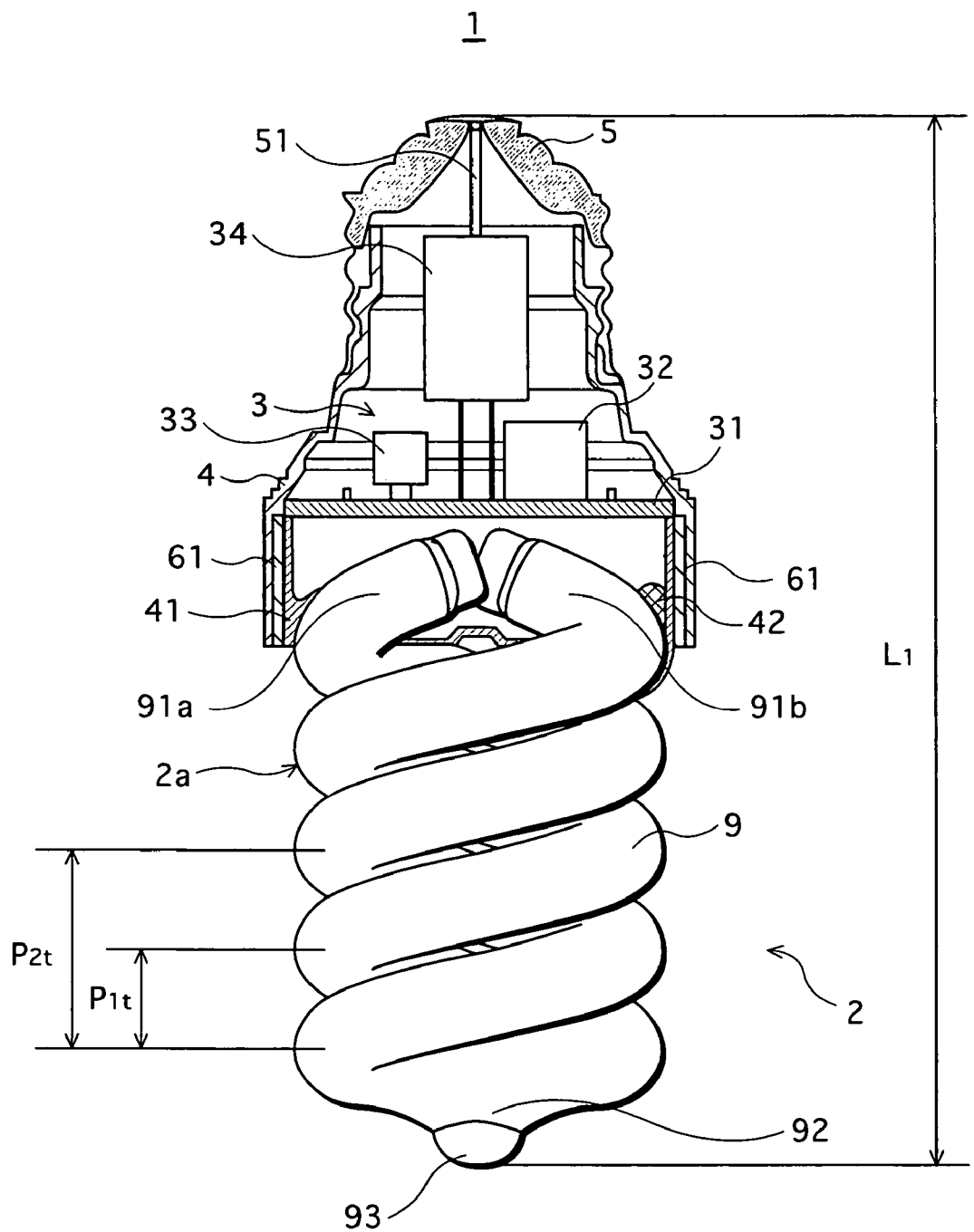
FIG. 3 is a front view showing across section of compact a self-ballasted fluorescent lamp in a first embodiment of the present invention.

FIG. 3 is a front view of the a cross section of the compact self-ballasted fluorescent lamp of the present embodiment. The compact self-ballasted fluorescent lamp 1 (hereinafter called the "lamp 1") is a 12 W lamp, and is an alternative to a 60 W incandescent lamp. It should be noted that a 60 W incandescent lamp has a maximum outer diameter of approximately 60 mm and a total length of approximately 110 mm.

As shown in FIG. 3, the lamp 1 includes a double spiral arc tube 2, an electronic ballast 3 for lighting the arc tube 2, and a case 4 that contains the electronic ballast 3 and has a base 5.

Figure 4:
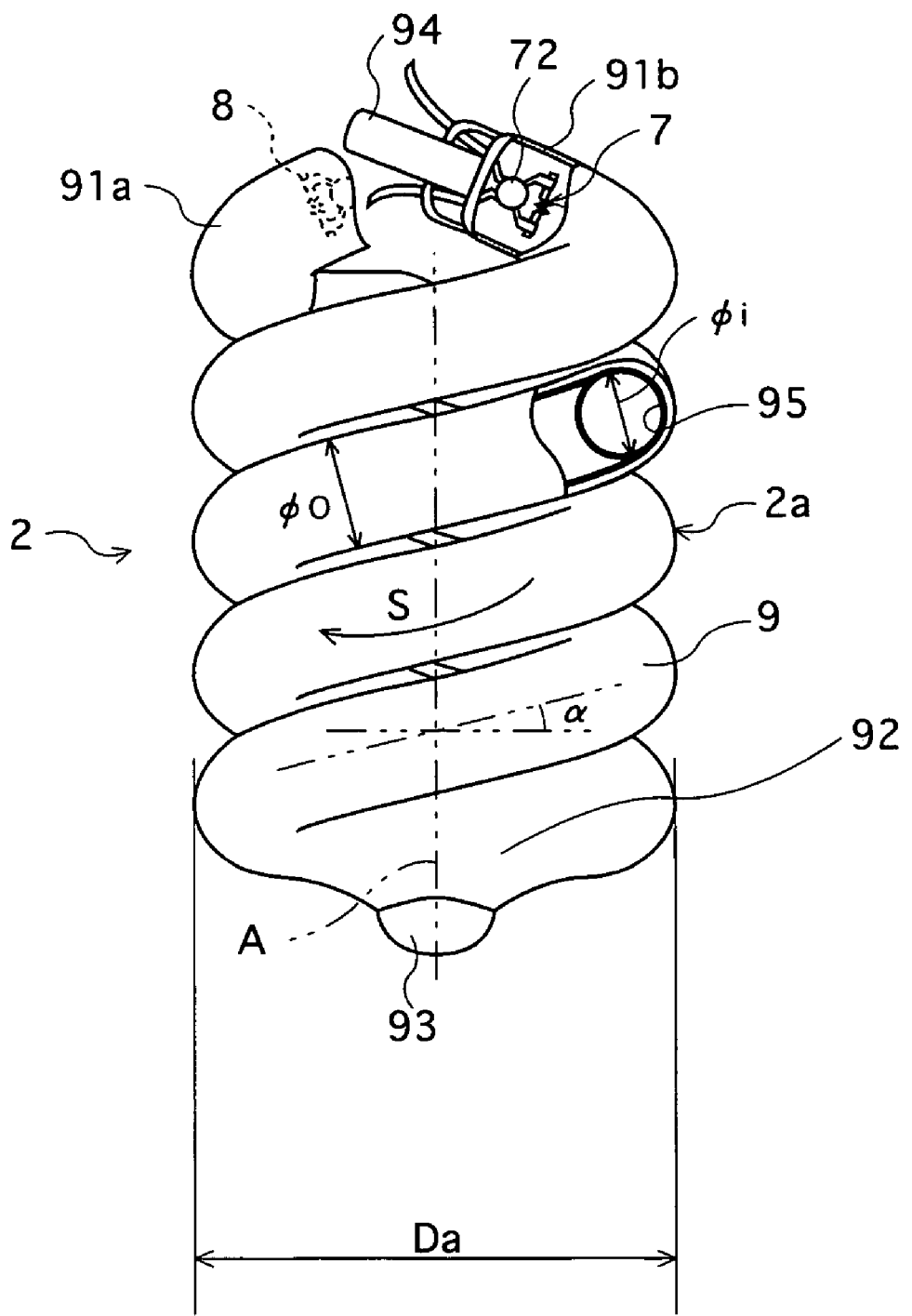
FIG. 4 is a front view showing the structure, partially cut away, of the arc tube of the first embodiment of the present invention.

FIG. 4 is a front view showing the structure of the arc tube partly cut away.

The arc tube 2, as shown in FIGS. 3 and 4, is formed in a double spiral by winding the glass tube 9. This glass tube 9 is turned at a turning part 92 in substantially the center thereof, and the ends are wound in an S orientation on a spiral axis A (see FIG. 4).

The glass tube 9 is made of soft glass such as barium strontium silicate glass, and has an inner diameter øi of approximately 7.4 mm and an outer diameter øo of approximately 9.0 mm. The number of turns from the turning part 92 through to the end parts 91a and 91b is approximately 4.5 including both ends of the turning part 92.

Note that it is preferable that the inner diameter øi of the glass tube 9 is at least 5 mm and no more than 9 mm. This is because positioning electrodes (described later) in the glass tube 9 is difficult if the inner diameter is less than 5 mm, and the arc tube 2 will be larger than a conventional 60 W incandescent lamp if the inner diameter øi is greater than 9 mm.

The pitch $P_{2t}$ between neighboring spiral parts from the turning part 92 through to the end parts 91a and 91b is 20 mm, and the pitch $P_{1t}$ between neighboring parts of the glass tube 9 in the spiral axis A direction is 10 mm (see FIG. 3). Consequently, the gap between the neighboring parts of the glass tube in the spiral axis A direction is approximately 1 mm. This gap is preferably 3 mm or less because when the gap is greater than 3 mm the length of the arc tube 2 increases, in addition to inconsistencies in luminosity occurring due to distance between the neighboring parts of the glass tube.

A lower part (hereinafter called a "tip part") of the arc tube 2 shown in FIGS. 3 and 4 is the part of the lamp 1 that has the lowest wall temperature, in other words is the coldest part, during illumination of the lamp 1. A protrusion 93 is formed protruding from the bottom (the opposite end to the metal base 5 in the spiral axis direction). Note the length of the double spiral arc tube 2 (from the protrusion 93 through to the tip of an electrode insertion part) is approximately 65 mm, and the maximum outer diameter Da is approximately 36.5 mm.

Here, the glass tube formed into a double spiral is called a "double spiral glass tube" which is shown by a reference numeral 2a (see FIG. 4). This end part of the double spiral glass denotes the same part as the end part of the glass tube 9.

Electrodes 7 and 8 are sealed respectively in the end parts 91a and 91b of the double spiral glass tube 2a. These electrodes 7 and 8 are, for example, tungsten coil electrodes. As shown in FIG. 4, each of the coil electrodes is supported by a pair of lead wires fixed by a glass bead 72 (a so-called glass bead mounting method). The lead wires extend from respective ends of the arc tube 2 and are connected to the electronic ballast 3. Note that although details of the electrode 8 and the end part 91a of the electrode 8 side are not shown in the drawings, the electrode 8 is supported by lead wires in the same way as the electrode 7, and the end part 91a has the same structure as the end part 91b.

An exhaust tube 94 for evacuating the glass tube 9 is fitted to one end part (the end part 91b here) of the double spiral glass tube 2a together with the electrode 7. Note that the distance between electrodes in the double spiral glass tube 2a is approximately 400 mm.

A rare earth phosphor layer 95 is formed on the inner surface of the double spiral glass tube 2 as shown in FIG. 4. This phosphor layer 95 is formed using a mixture of phosphors for three bands, specifically, red, green and blue. Note that although not illustrated, a thin layer of aluminium oxide ($Al_2O_3$) is formed between the inner surface of the double spiral glass tube 2a and the phosphor layer 95. The aluminium oxide prevents formation of an amalgam caused by a reaction between sodium ions from the glass tube 9 and mercury electrons (described later).

Furthermore, within the double spiral glass tube 2a, 5 mg of mercury is singly enclosed, and a rare gas such as argon at is enclosed at 600 Pa. This mercury and argon is enclosed via the exhaust tube 94 which is then sealed according to a tip-off method. Here, it is not necessary for the mercury to be singly enclosed in the glass tube 9, however it is necessary for mercury evaporation pressure during illumination of the arc tube 2 to be substantially that of singular mercury. As one example, zinc-mercury may be used.

The arc tube 2 is held by a holder 41 via an adhesive such as silicone, with end parts 91a and 91b being placed in the holder 41. A substrate 31 is attached at the backside of the holder 41 (the side where the base 5 is provided), and electronic components 32, 33, and 34 for illuminating the arc tube 2 are attached to the substrate 31. It should be noted that these electronic components 32, 33 and 34 form the electronic ballast 3, which employs a series inverter method and has a circuit efficiency of 91%.

The case 4 is made of a synthetic resin, and has a tubular shape that increases in diameter towards its bottom end. The holder 41 is placed in the opening of the case 4, so that the side of the holder 41 where the electronic ballast 3 is provided is positioned back within the case 4. The E26 type base 5 is attached to the top end of the case 4, which is the opposite side to the opening of the case 4.

It should be noted that the base 5 and the electronic ballast 3 are electrically connected via a lead wire 51, and the length L1 of the lamp 1 is 104 mm (see FIG. 3).

2. Arc Tube Manufacturing Method

Figure 5:
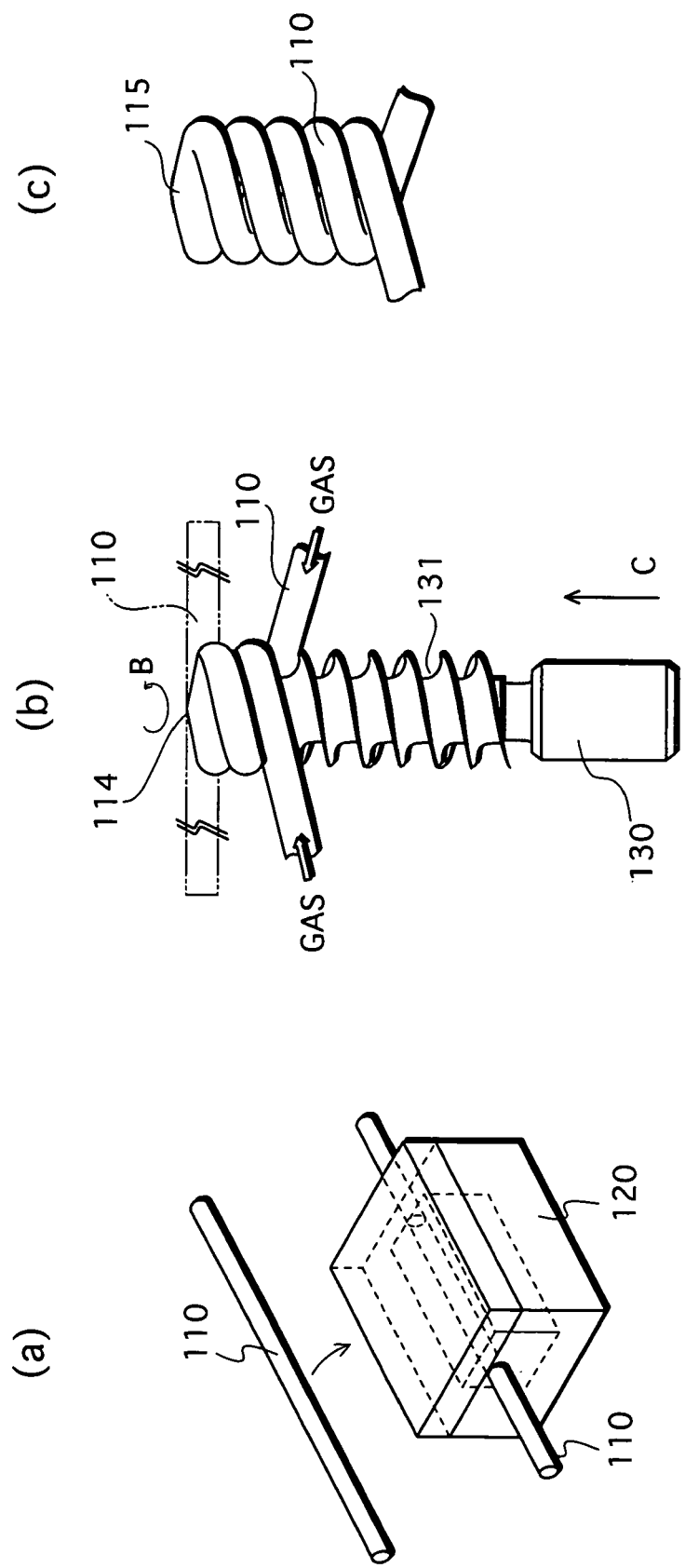
FIG. 5 shows a process for forming the double spiral glass tube of the first manufacturing method into a double spiral.

The following describes the manufacturing method of the arc tube 2. FIGS. 5 and 6 explain the process for forming the glass tube into a double spiral, and FIG. 7 explains the process for forming the phosphor layer in the double spiral glass tube. Note that the following is a description of the processes for forming a straight glass tube into the double spiral glass tube 2a and forming the phosphor layer in the double spiral glass tube 2a. The subsequent processes of sealing electrodes and enclosing rare gas, mercury and the like are the same as a conventional method, and therefore not described here.

(1) Formation of the Arc Tube a. Glass Tube Softening Process

First, a straight glass tube 110 as shown in FIG. 5(a) is prepared. This glass tube 110 has a substantially circular cross sectional shape, an internal diameter of approximately 7.4 mm, and an outer circumference of approximately 9.0 mm. Next, a middle part of the straight glass tube 110 (here, the middle part includes at least the section of the glass tube 110 that is to be wound into a spiral) is set in an electric or gas furnace 120 as shown in FIG. 5(a), and heated to a temperature at least as high as the softening point of the glass tube 110, thereby softening the middle part of the glass tube 110.

b. Glass Tube Winding Process

The softened glass tube 110 is removed from the furnace 120, and placed on a mandrel 130 (made of stainless steel) in such a manner that a substantially middle part 114 is aligned with the top of the mandrel 130 as shown in FIG. 5(b). Then the mandrel 130 is rotated in a B direction while being moved in a C direction by a driving device (not illustrated).

This results in the softened glass tube 110 being wound around the mandrel 120. Note that the substantially middle part 114 of the glass tube 110 becomes the turning part (or the tip part) 115, and the parts that are spirally wound in spiral grooves 131 on the outer surface of the mandrel 130 become the spiral part.

During the winding of the glass tube 110 around the mandrel 130, a pressure-controlled gas such as nitrogen is blown into the glass tube 110 at 0.4 kg/cm³ so as to retain the cross sectional shape of the glass tube 110.

When the softened glass tube 110 has cooled and returned to a hard state, the mandrel 130 is rotated in the opposite direction to when the glass tube 110 was wound around the mandrel 130 (the opposite direction to the B direction is FIG. 5(b)) in order to remove the glass tube 110 that has been formed into a double spiral from the mandrel 130.

c. Protrusion Formation Process

The tip part 115 of the glass tube 110 that has been wound into a double spiral as described is heated locally with a gas burner or the like, as shown in FIG. 6(a). When the heated part has softened, a mould is placed over the tip part 115 so as to cover the softened part as shown in FIG. 6(b). This mould 140 has a recess 142 formed therein that corresponds to desired protrusion.

When the mould 140 is placed on the tip part 115 of the glass tube 110 so that the center of the part to be inflated and the center of the recess 142 are substantially aligned, a pressure-controlled gas such as nitrogen gas is blown into the glass tube 110 from both end parts, causing the softened tip part 115 of the glass tube 110 to inflate towards the inner wall of the recess 142 of the mould 140.

When the tip part 115 of the glass tube 110 has been inflated, the glass tube 110 is left while the tip part 115 cools, and then the mould 140 is removed. As a result of this process a semispherical protrusion 116 is formed in the original tip part 115 of the glass tube 110 (see FIG. 6(c)).

The glass tube 110 in which the protrusion 116 has been formed is then cut at each end in a predetermined place. Note that the double-spiral glass tube formed as described will be given the name "bent glass tube" and the reference number "100" to distinguish it from the glass tube 110 when in the straight form or being subject to the winding process.

(2) Phosphor Layer Formation a. Injection Process

This process is for injecting a suspension into the double spiral glass tube 100. The method for forming the phosphor layer on the inner surface of the double spiral glass tube 100 formed as described and for use in the arc tube 2 is described with use of FIG. 7.

First, a suspension is formulated that includes phosphor for three bands, specifically, red, green and blue. The phosphors used in the present embodiment are: europium-inactivated yttrium oxide ($Y_2O_3$:$Eu^{3+}$) for red, cerium terbium-inactivated lanthanum phosphate ($LaPO_4$:$Ce^{3+}$, $Tb^{3+}$) for green, and europium-inactivated barium magnesium aluminate ($BaMg_2Al_{10}O_{17}$:$Eu^{2+}$) for blue.

The suspension is water-based, and in addition to the phosphors includes 1–3 wt % of polyethylene oxide as a binder, 2 wt % of a lanthanum aluminum oxide as an adhesive agent, and a surface-active agent. The suspension is formulated to have a viscosity of approximately $4.1*10^{-3}$ Pas.

Note that, as one example, a butyl acetate base may be used instead of a water base. When a butyl acetate base is used, the suspension is formulated with 1–3 wt % of nitrocellulose as a binder, 2 wt % of boron calcium phophate as an adhesive agent, and a surface active agent, and to have a viscosity of approximately $4.1*10^{-3}$ Pas.

Next, with the turning part 105 of the double spiral glass tube 100 at the bottom, the double spiral glass tube 100 is inclined so that the angle between the spiral axis A of the double spiral glass tube 100 and a vertical axis V (a vertical direction) is 135 degrees.

Next, the double spiral glass tube 100 is rotated and positioned such that the end surface of one end part 101 faces upward, and suspension, for example approximately 20 cc, is injected through the upward-facing opening of the end part 101, using, for example, an injection nozzle (not illustrated).

The reason for an inclination angle of 135 degrees is that this inclination angle enables the end surface of the end part 101 of the double spiral glass tube 100 to face exactly upward, and therefore enables the suspension to be injected easily.

b. Coating Process

This process is for coating the entire inner surface of the double spiral glass tube 100 with the suspension. The suspension injected in the injection process flows downward toward the turning part 105 in the double spiral glass tube 100 that has been wound into the spiral shape. When the 20 cc of suspension has been injected, the double spiral glass tube 100 is set so that the position of the end part 101 is higher than the turning part 105, in order to prevent the injected solution from coming back out through the end part 101. As one example, in the present embodiment the double spiral glass tube 100 is put into a standing position so that the turning part 105 is at the bottom as shown in FIG. 7(b).

In other words, the spiral axis A of the double spiral glass tube 100 is substantially parallel to the vertical axis V.

This process improves the wettability of the suspension with the inner surface of the double spiral glass tube 100, while also enabling the suspension to flow smoothly to the turning part 105. Note that the suspension can be made to reach the turning part 105 more quickly if the double spiral glass tube 100 is shaken lightly while in the standing state. Therefore, it is possible to shake the glass tube 100 either continuously or intermittently while it is in the standing position.

The suspension is formulated to have a viscosity that enables it to flow downward over the whole cross section of the double spiral glass tube 100. Consequently, if the suspension is injected through one end part 101 of the double spiral glass tube 100 and reaches the turning part 105, the part of the double spiral glass tube 100 through the end part 101 to the turning part 105, in other words substantially half of the double spiral glass tube 100 that has been formed into the double spiral shape, is coated. Here, the suspension is injected through one end of the double spiral glass tube 100 and released through the opening of the other end, and therefore flows smoothly inside the double spiral glass tube 100.

Note that although the viscosity is approximately $4.1*10^{-3}$ Pas here, it is sufficient for the viscosity to be within a range of $3.0*10^{-3}$ Pas to $5.0*10^{-3}$ Pas inclusive. This is because the suspension does not coat the entire circumference in the cross section of the double spiral glass tube 100 when the viscosity is below $3.0*10^{-3}$ Pas, whereas when the viscosity is greater than $5.0*10^{-3}$ Pas the suspension coats the entire inner surface, but either does not flow to the turning part or takes an excessive amount of time to do so. This significantly reduces production efficiency.

Note that in the coating process the temperature of the double spiral glass tube 100 is 25° C. to 60° C. This is because when the temperature of the double spiral glass tube 100 is too high the viscosity of the suspension is reduced and the fluidity of the suspension increases, making the amount of suspension that coats the inner wall of the double spiral glass tube 100 difficult to control. Conversely, when the temperature of the double spiral glass tube 100 is too low, the fluidity of the suspension is reduced, and wettability is also reduced.

c. Draining Process

This process is for draining excess suspension from the double spiral glass tube 100 through the end parts 101. When the suspension that flows in the double spiral glass tube 100 in the standing position in the coating process has reached the turning part 105, the double spiral glass tube 100 is turned upside down so that spiral axis A of the double spiral glass tube 100 is at a 45 degree angle with respect to the V axis, and so that the turning part 105 faces upward as shown in FIG. 7(c). Next, while in the inclined position, the double spiral glass tube 100 is rotated at a speed of approximately 3.5 rotations per minute in an X direction with the spiral axis A as the axis of rotation, thereby causing the suspension in the double spiral glass tube 100 to drain (discharge) through the end parts 101.

Note that the rotation direction is the direction in which the spiral part of the double spiral glass tube 100 spirally winds, and is the direction from the end part 101 of the double spiral glass tube 100 toward the turning part 105 (the opposite direction to the S direction in FIG. 4). The effect of centrifugal force when rotating the double spiral glass tube 100 in this way leaves a necessary amount of suspension in the double spiral glass tube 100 for a preliminary drying process described later. At this time, in the spiral parts from one end part 101 of the double spiral glass tube 100 through to the turning part 105, the flowing suspension can be discharged through the end parts 101 while coating the outer parts of the double spiral glass tube (in other words, the parts of the inner surface of the double spiral glass tube 100 that are furthest from the spiral axis A).

Furthermore, it is suitable for the speed of rotation to be within a range of two rotations per minute and twenty rotations per minute inclusive. This is because the flow of the suspension from the end part 101 is excessive when the speed is less than two rotations per minute. Conversely, when the speed is greater than twenty rotations per minute, centrifugal force causes the flow of suspension from the end part 101 to be insufficient, and an excessive amount of time is required for discharging the suspension.

Here, the reason for inclining the double spiral glass tube 100 spiral axis A with respect to the vertical axis V is to adjust the flow of the suspension from the end part 101, and therefore optimize the amount of suspension that coats the inner surface of the double spiral glass tube 100. The angle of inclination may be within a range of 5 degrees and 90 degrees inclusive. This is because when the angle is less than 5 degrees, the suspension flows too quickly, and inner surface of the double spiral glass tube 100 is not coated with a sufficient amount of suspension. Conversely, when the angle is greater than 90 degrees, the flow is too slow, and work efficiency is reduced.

Finally, discharge of excessive suspension is considered to be complete when thirty seconds has elapsed (hereinafter called "draining time") since turning the double spiral glass tube 100 upside down so that the turning part 105 is at the top. The draining time may be within a range of 15 seconds to 60 seconds inclusive.

If the draining time is less than 15 seconds, the suspension is not sufficiently drained, and remains excessively in the double spiral glass tube 100. Conversely, when the draining time is longer than 60 seconds, there is no difference in the amount of suspension that remains in the double spiral glass tube 100, and production efficiency is reduced. Here, the necessary amount of suspension for the preliminary drying process is considered to be 0.5 cc to 2 cc. The speed of rotation of the double spiral glass tube 100 and the draining time are set so as to ensure this amount remains.

When discharge of the suspension from the one end part 101 of the double spiral glass tube 100 is complete, 10 cc of suspension are injected from the other end part, and the coating process and the draining process are repeated. As a result, the whole inner surface of the double spiral glass tube 100 is coated with suspension.

d. Preliminary Drying Process

This process is for preliminary drying of the suspension coating the inner surface of the double spiral glass tube 100, as well as using the suspension that remains in the double spiral glass tube 100 to coat and dry on the inner surface of the double spiral glass tube 100 evenly. This process is also for discharging remaining suspension.

When the inner surface of the double spiral glass tube 100 has been coated according to the draining process, the double spiral glass tube 100 is inclined so that the angle between the spiral axis A of the double spiral glass tube 100 and the vertical axis V is 100 degrees, and so that the turning part 105 is at the bottom as shown in FIG. 7(d). In this state, the double spiral glass tube 100 is continuously rotated in a Y direction with the spiral axis A as the axis of rotation, at a speed of approximately 3.5 turns per minute. This takes place in an atmosphere of 100° C. Furthermore, during rotation, gas such as air is blown into the double spiral glass tube 100 alternately through each end part 101.

The gas blown into the double spiral glass tube 100 is warm air of a temperature in a range of 30° C. to 50° C. inclusive. This is because drying takes much time if the temperature is below 30° C., but if the temperature is above 50° C., the suspension remaining in the double spiral glass tube 100 dries too quickly, preventing the inner surface of the double spiral glass tube 100 from being coated evenly with remaining suspension.

Since the double spiral glass tube 100 is inclined so that the turning part 105 is at the bottom, the suspension in the double spiral glass tube 100 can be made to flow to the turning part 105, which is ordinarily difficult to coat with the suspension. Note that in order to have the suspension flow to the turning part 105, the double spiral glass tube 100 should be inclined so that the angle between the spiral axis A and the vertical axis V is at least 90 degrees.

Figure 8A:
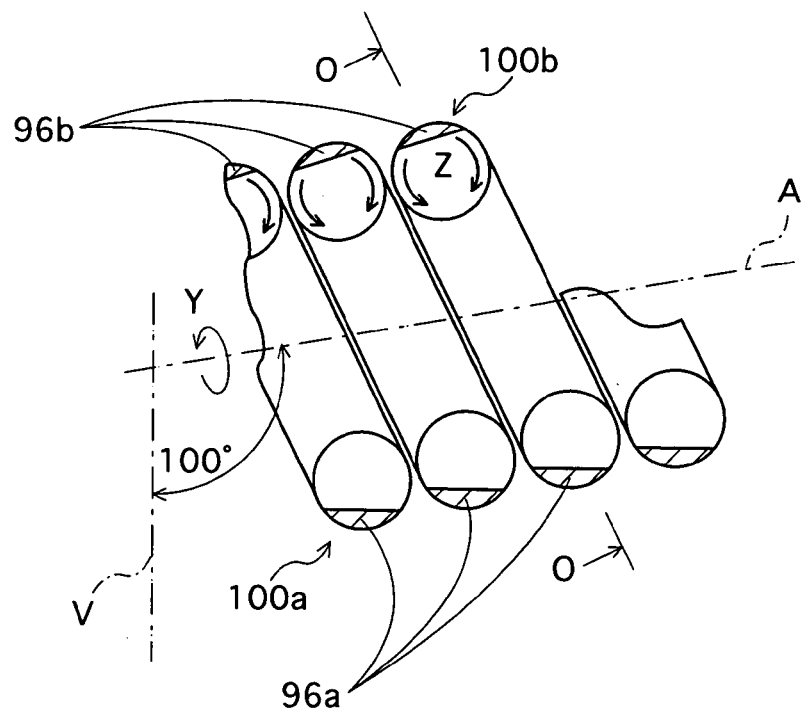
FIGS. 8A and 8B are schematic drawings showing fluidity of suspension remaining inside the double spiral glass tube when forming the phosphor layer of the double spiral glass tube in the first manufacturing method.
Figure 8B:
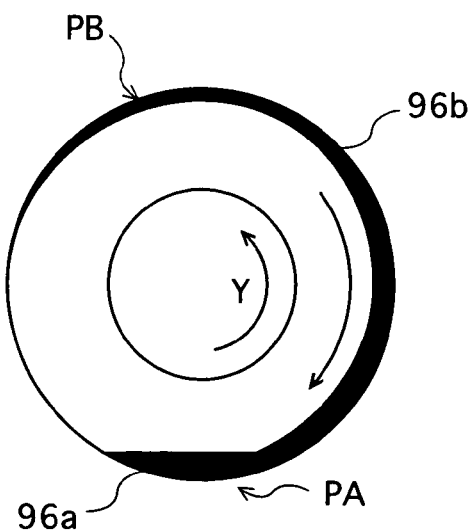

The following describes the flow of the suspension in the double spiral glass tube 100 when the double spiral glass tube 100 is inclined and rotated. FIGS. 8A and 8B show the flow of the suspension in the double spiral glass tube 100 schematically.

The double spiral glass tube 100 shown in FIG. 8A is the double spiral glass tube 100 shown in FIG. 7(*d*), having been cut in a vertical direction. FIG. 8A shows how suspension 96*a* accumulates at the bottom side of the cross section of each glass tube 100*a* that makes up the double spiral glass tube 100, on the bottom side in the drawing.

FIG. 8B shows a cross section of the double spiral glass tube 100 cut along a line O—O and seen from an arrow direction in FIG. 8A. By rotating the double spiral glass tube 100 in the Y direction in FIG. 8B, suspension 96*a* accumulated in a lowest position PA of the double spiral glass tube 100 reaches a highest position PB of the inner surface of the double spiral glass tube 100, and flows downwards in the opposite direction to the Y direction.

On the other hand, in the cross section of each glass tube 100*b* that makes up the double spiral glass tube 100, at the top side, as shown in FIG. 8A, the suspension 96*b* that reaches the highest position PB flows downward along the inner surface of each glass tube 100*b* in a Z direction. Accordingly, even if the suspension 96*a* accumulates thickly at a low position PA of the double spiral glass tube 100, when the suspension reaches the next high position PB, the suspension 96*a* flows downward also in a different direction to the direction in which the suspension flowed to reach the high position PB (the opposite direction to the Y direction in FIG. 8B), and therefore coats the inner surface of the double spiral glass tube 100 thinly.

In addition, since the suspension flows downward in various directions, the suspension coats inner surface of the double spiral glass tube 100 evenly because it coats over various parts of the inner surface. Since the suspension is subject to preliminary drying in this even state, the formed phosphor layer is even in thickness.

In order for the suspension to flow downward along the inner surface from the high position in the spiral part of each turn, it is necessary for there to be suspension left at the high position (in other words, the state shown in FIG. 8A). The inventors experimented to find conditions for suspension viscosity, double spiral glass tube rotation rate, and the like to enable this.

Furthermore, since the double spiral glass tube 100 rotates in a direction that is the direction in which the spiral part spirals and the direction from the end part 101 to the turning part 105 (the Y direction in the FIG. 7(*d*)), the suspension in the double spiral glass tube 100 does not accumulate in one position in the double spiral glass tube 100, but covers the inner surface of the double spiral glass tube 100 evenly from the turning part 105 through to the end part 101 side, while also being successively discharged through the end part 101.

Note that the amount of time for the preliminary drying of the suspension in the double spiral glass tube 100 is one in which the suspension coating the inner surface of the double spiral glass tube 100 loses its fluidity, and is approximately seven minutes in the present embodiment.

Note also that when performing preliminary drying of the suspension coating the inner surface of the double spiral glass tube 100 and the suspension remaining in the double spiral glass tube 100, the temperature of the outer surface of the double spiral glass tube 100 is within a range of 40° C. to 50° C. inclusive. This range enables better wettability between the suspension and the inner surface of the double spiral glass tube 100, as well as enabling the suspension to coat the inner surface evenly.

Note that wettability between the suspension and the inner surface of the double spiral glass tube 100 can be improved if the temperature of the outer surface of the double spiral glass tube 100 is in a range of 30° C. to 60° C. inclusive. Experiments showed that favorable wettability is also obtained within this temperature range when a butyl acetate base is used in the suspension.

When the temperature of the outer surface of the double spiral glass tube 100 is less than 30° C., much time is required for the preliminary drying, and therefore productivity drops. Conversely, when the temperature of the outer surface of the double spiral glass tube 100 is higher than 60° C., the suspension on the inner surface of the double spiral glass tube 100 dries too quickly, and as a result, suspension that is newly coated on top of already-coated parts when the double spiral glass tube 100 is rotated dries quickly, causing suspension to be coated too thickly on that part.

Since 40° C. gas is blown into the double spiral glass tube 100 through the end part 101, the suspension is dried from both the inside and the outside of the double spiral glass tube 100. This enables the time required to dry the suspension coating the inner surface of the double spiral glass tube 100 to be reduced, and also reduces unevenness in the thickness of the suspension on the inside surface of the double spiral glass tube 100.

The temperature of the gas blown into the double spiral glass tube 100 should be in a range of 30° C. to 50° C. inclusive. When the temperature is less than 30° C., the suspension takes too long to dry, and therefore productivity is reduced. When the temperature is higher than 50° C., the suspension newly-coated according to the rotation of the double spiral glass tube 100 dries quickly when directly exposed to the gas, and bands of thickly-formed parts are formed.

e. Main Drying Process

This process is for the main drying of the suspension on the inner surface of the double spiral glass tube 100. Note that here the suspension is substantially fixed to the inner surface and has already lost fluidity. The double spiral glass tube 100 that has been subject to the preliminary drying process is dried in a furnace while in a position such that the turning part is at the top as shown in FIG. 7(*e*).

Here, warm air is fed in to double spiral glass tube 100 alternately through each end part 101 so that drying is performed efficiently. The double spiral glass tube 100 is dried for approximately eight minutes in the furnace whose temperature is set at approximately 45° C. As a result of this drying, the suspension coating the inner surface of the double spiral glass tube 100 is completely dried, and the phosphor layer is formed. Note that the warm air is, for example, fed by a nozzle at a rate of 6 l/min, and has a temperature of 40° C.

3. Appearance of the Arc Tube

A visual inspection of an arc tube manufactured according to the described method (hereinafter called the "first manufacturing method") detected none of the bands of thickly-formed parts that are found in conventional arc tubes, and therefore the phosphor layer is assumed to have been formed more evenly that in an arc tube manufactured according to a conventional method. The following compares an arc tube in which the phosphor layer is formed according to the present invention (hereinafter this arc tube is referred to as the "first invention arc tube") and an arc tube in which the phosphor layer is formed according to a conventional method (hereinafter this arc tube is referred to as the "conventional arc tube") in terms of phosphor layer mass per unit of surface area. Note that this mass is also referred to as the "phosphor adhesion amount".

(1) Phosphor Adhesion Amount in the First Invention Arc Tube

Figure 9:
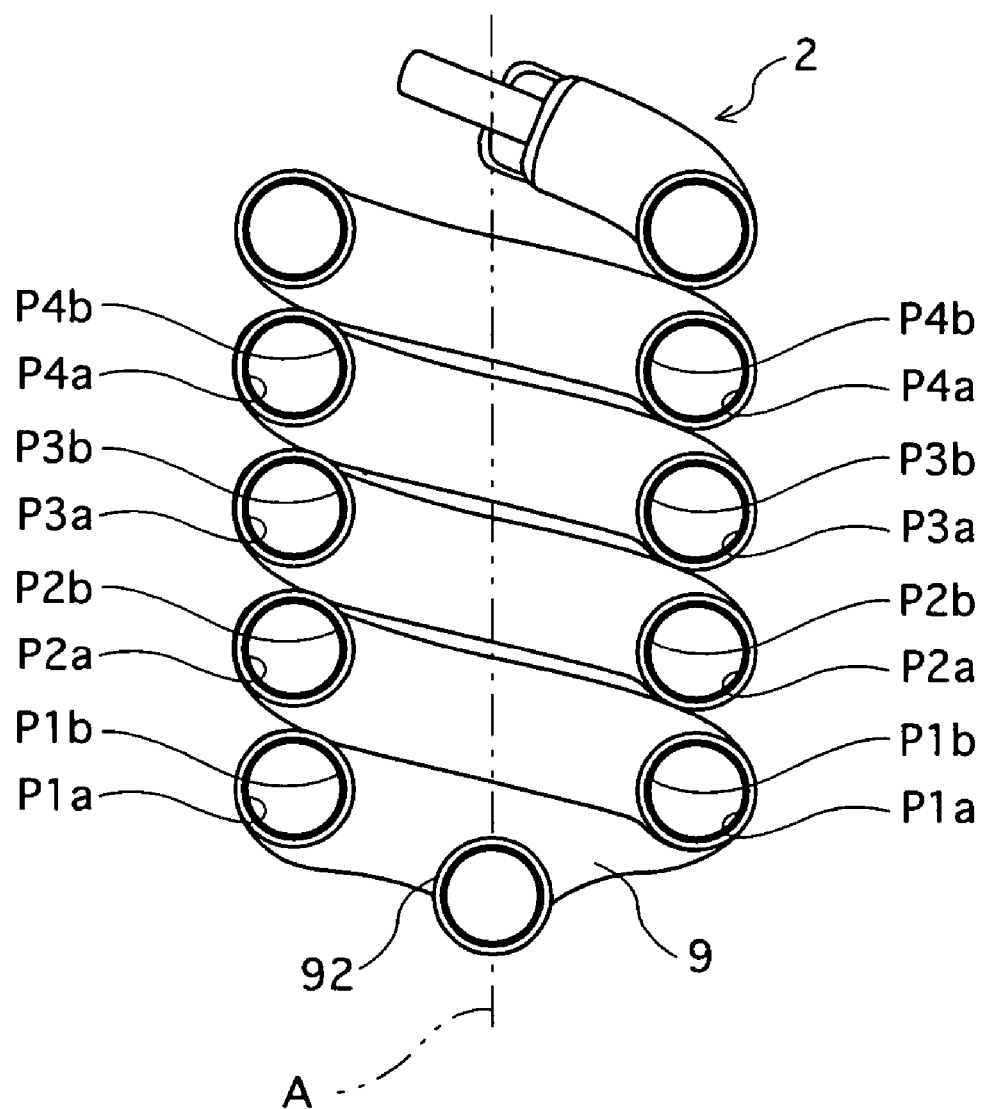
FIG. 9 shows phosphor layer thickness measurement positions in an arc tube manufactured according to the first manufacturing method.

The phosphor adhesion amount was measured for the first invention arc tube manufactured according to the method described earlier in (2) in the description of the manufacturing method. The measurement positions are determined as follows. Supposing the arc tube 2 is cut as shown in FIG. 9 at a plane including the spiral axis A in a horizontal direction (along the surface of the paper on which the drawing is drawn), the measurement positions are the positions in the cross section of each n-th turn that oppose each other in a direction that passes through the center of the glass tube 9 and is orthogonal to the spiral axis A.

Note that in the references Pna and Pnb that represent measuring positions, "n" signifies the number of turns from the turning part 92, "a" signifies that the measurement position is the outer of the two measurement positions in the direction orthogonal to the axis direction, in one cross section of the glass tube 9, in other words the outer measurement position in the radial direction of the arc tube, and, similarly, "b" signifies that the measurement position is the inner of the two measurement positions in the radial direction.

Here, the mass per unit of surface area of the phosphor layer in each measuring position is what is actually measured as the thickness of the phosphor layer. This mass is a reference showing the thickness of the phosphor layer, and hereinafter both the phosphor adhesion amount and thickness denote this phosphor layer mass per unit of surface area.

Note that the reason for using the inside and outside in the radial direction of the arc tube 2 in the cross section of the glass tube 9 as the phosphor adhesion amount measuring positions is that since the glass tube 9 is laid down so that the spiral axis A is substantially horizontal in order for the spiral axis A of the glass tube 9 to be at a 100 degree incline with respect to the vertical axis V, the direction of the gravity on the suspension is the radial direction of the arc tube 2 in the cross section of the glass tube 9. The results obtained by measuring the thickness of the phosphor layer in each of the measurement positions are shown in FIG. 10.

The results in FIG. 10 are obtained by measuring at two positions between which the spiral part winds by 180 degrees around the spiral axis A, for each of Pna and Pnb shown in FIG. 9, and averaging each two measurements. The mass per unit of surface area of the phosphor layer formed on the inner surface of the glass tube 9 is, as shown in FIG. 10, from 4.1 mg/cm$^2$ to 8.4 mg/cm$^2$.

Figure 11:
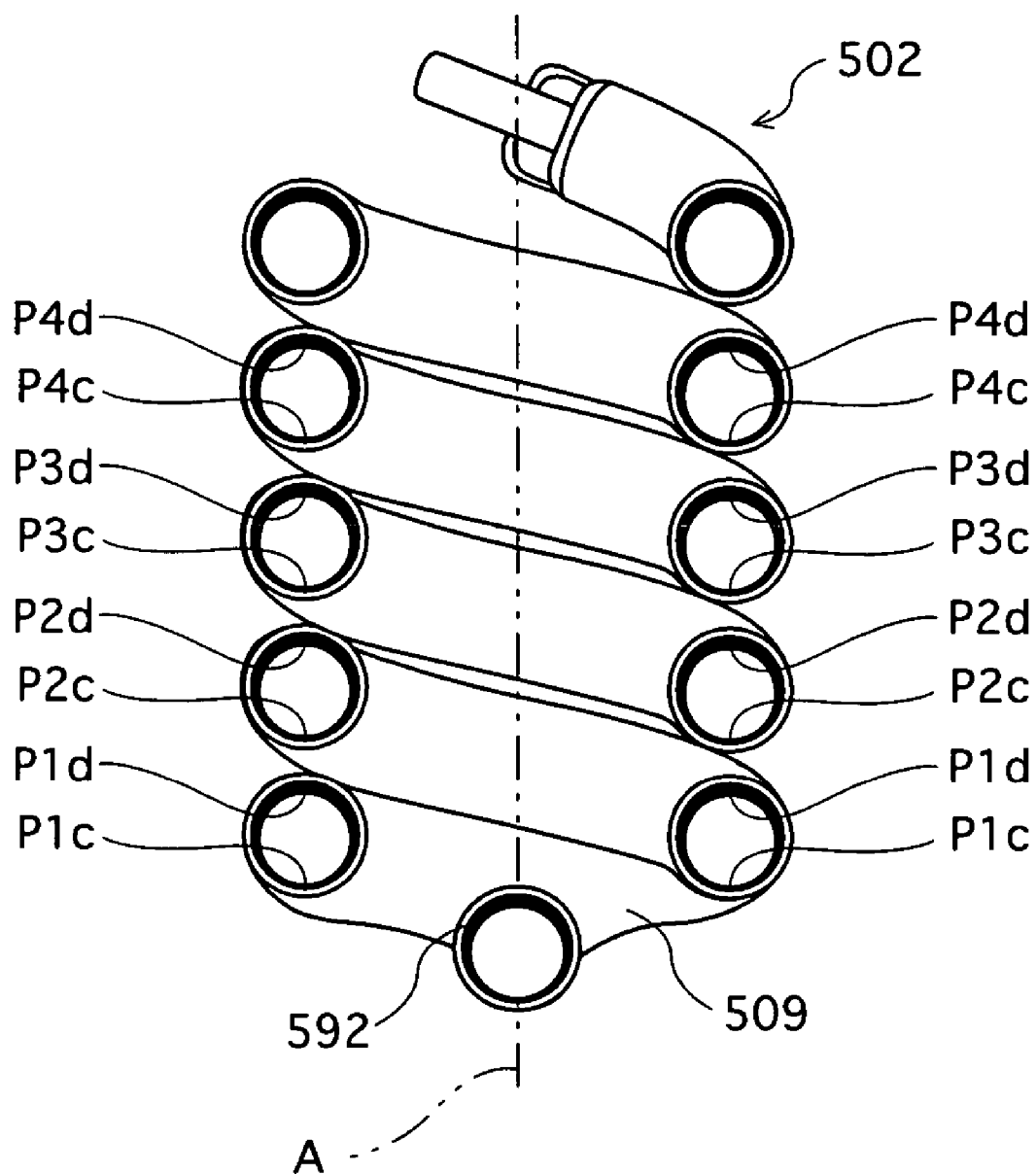
FIG. 11 shows phosphor layer thickness measurement positions in an arc tube manufactured according to a conventional manufacturing method.

(2) Phosphor Adhesion Amount in the Conventional Arc Tube Manufactured According to the Conventional Method The measurement positions of the phosphor layer mass per unit of surface area are determined as follows. Supposing that the arc tube 502 is cut as shown in FIG. 11 at a plane including the spiral axis A in an orthogonal direction to the surface paper on which the drawing is drawn, the measurement positions are positions opposing each other in the cross section of each n-th turn in the spiral axis A direction that passes through the center of the double spiral glass tube 509.

Note that in the references Pnc and Pnd that represent measurement positions, "n" signifies number of turns from the turning part 592, "c" signifies that the measurement position is, of the two measurement positions, the one closer to the top side in the S direction in one cross section of the double spiral glass tube 509 (note that such positions actually appear as being the lower of the two measurement positions in the drawing due to the orientation of the arc tube 502), and "d" signifies that the measurement position is, of two measurement positions, the one closer to the base side in the S direction in one cross section of the double spiral glass tube 509 (note that such positions actually appear as being the higher of the two measurement positions in the drawing due to the orientation of the arc tube 502), in other words the measuring position is on the opposite side to the turning part side in the cross section of the double spiral glass tube 509.

The results obtained by measuring the thickness of the phosphor layer in each of the measurement positions are shown in FIG. 12. Note that as described earlier, the mass per unit of surface area of the phosphor layer in each measuring position is what is actually measured as the thickness of the phosphor layer.

The phosphor adhesion amount in each position, as shown in FIG. 12, is 4.6 mg/cm$^2$ to 19.2 mg/cm$^2$. Furthermore, in each turn of the double spiral glass tube 509 the adhesion amount is greater on the base side than the top side in the cross section. In other words, the suspension accumulates in the parts of the glass tube 9 that correspond to the lower side in the cross section, and therefore phosphor layer is thicker in those parts.

(3) Comparison of the First Invention Arc Tube and the Conventional Arc Tube

The phosphor adhesion amount in the first invention arc tube ranges from 4.1 mg/cm$^2$ to 8.4 mg/cm$^2$, the difference between the maximum value and the minimum value being 4.3 mg/cm$^2$. In contrast, the phosphor adhesion amount in the conventional arc tube ranges from 4.6 mg/cm$^2$ to 19.2 mg/cm$^2$, the difference between the maximum value and the minimum value being 14.6 mg/cm$^2$.

These results clearly show that inconsistencies in the phosphor adhesion amount are dramatically improved in the first invention arc tube, and that, compared to the conventional arc tube, the phosphor layer is substantially even in the first invention arc tube.

In addition, while the phosphor layer is thicker in the base side in every set of same "n" values in the conventional art tube, the phosphor layer in the first invention arc tube does not display a tendency to always be thicker either the inside or the outside, but is formed substantially evenly.

On the other hand, a band of thickly-formed phosphor can be observed in the conventional arc tube in the spiral part near the end part of the double spiral glass tube 509 (when "n" is "4"), formed continuously along the lower side of the double spiral glass tube 509 in the spiral direction. This is supported numerically by the adhesion measurement results for "n" being "4" in the conventional arc tube which show a large difference between the adhesion amount at the top and base measurement positions (P4c, P4d), and also show that Pnd is greater than Pnc in any set of measurement positions.

As a result of this comparison, it is found that not only are thickly-formed parts such as seen in the conventional arc tube not observed in the first invention arc tube, but also that numerical data shows that the phosphor layer is formed substantially evenly.

4. External Appearance of the Arc Tube when Illuminated

Figure 13:
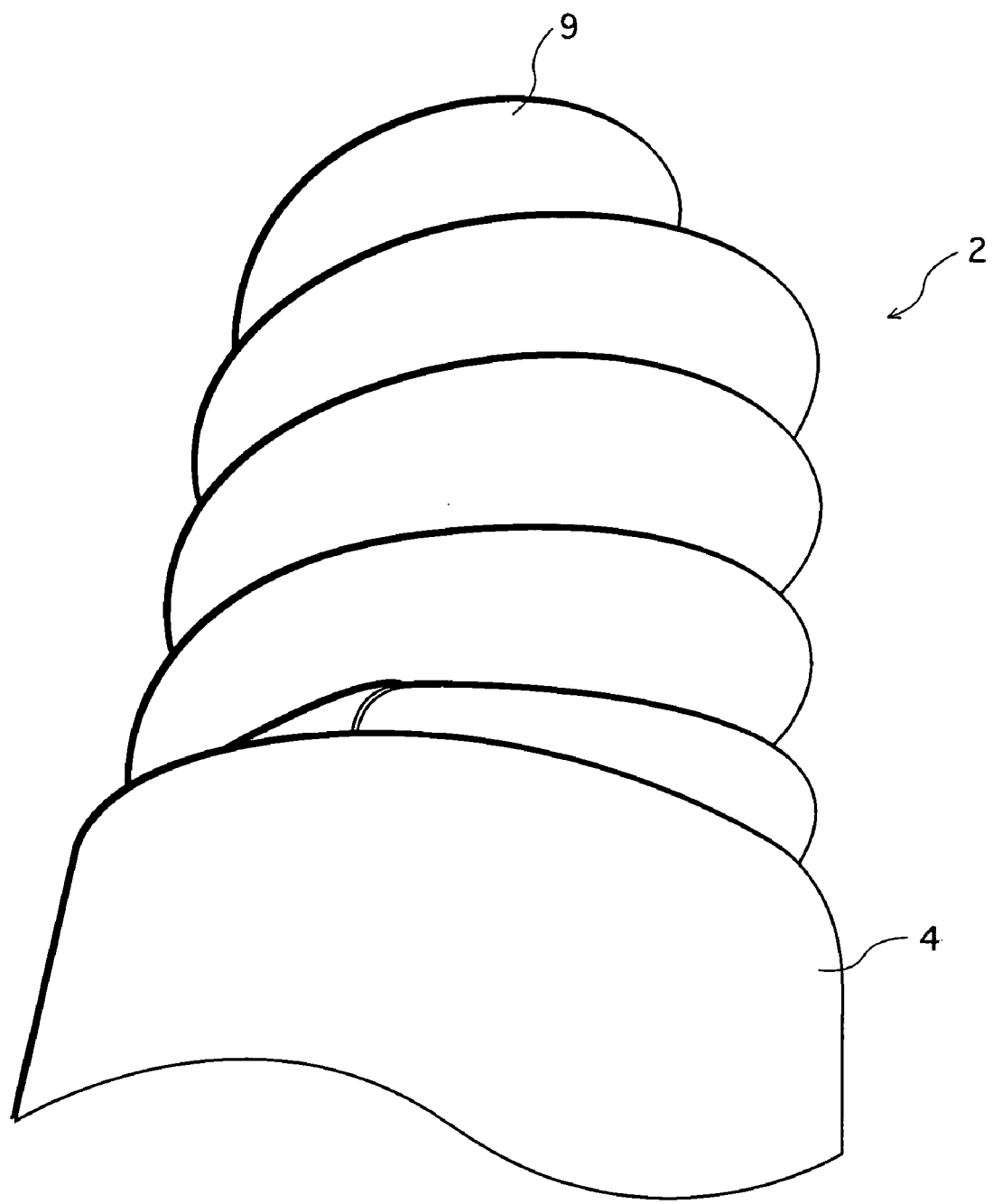
FIG. 13 is a schematic drawing showing a lamp that uses an arc tube manufactured according to the first manufacturing method, during illumination.

FIG. 13 shows the external appearance of the first invention arc tube when the lamp 1 that uses the first invention arc tube is illuminated.

When the lamp 1 that uses the first invention arc tube is illuminated, uniform visible light is emitted from the arc tube 2, as shown in FIG. 13. This is thought to be because the phosphor layer is formed substantially evenly on the inner surface of the double spiral glass tube 2a. Consequently, when illuminated, the lamp 1 does not exhibit the shadow caused by thickly-formed parts in a conventional arc tube, and therefore the illuminated lamp 1 can be said to have improved design over a conventional lamp.

5. Rated Life of the Lamp

The rated life of lamps 1 that use the first invention arc tube manufactured according to the first manufacturing method was measured. The rated life is how long the illuminated lamp is able to sustain a luminous flux of 60% after 100 hours.

Here, the reason for measuring the rated life of the lamps 1 is due to a demand for a rated life longer than the 6000 hours, 6000 hours being the target of lamps in which the phosphor layer is formed according to the conventional method described in the "Prior Art" (hereinafter, such lamps are referred to as "conventional lamps").

Figure 14:
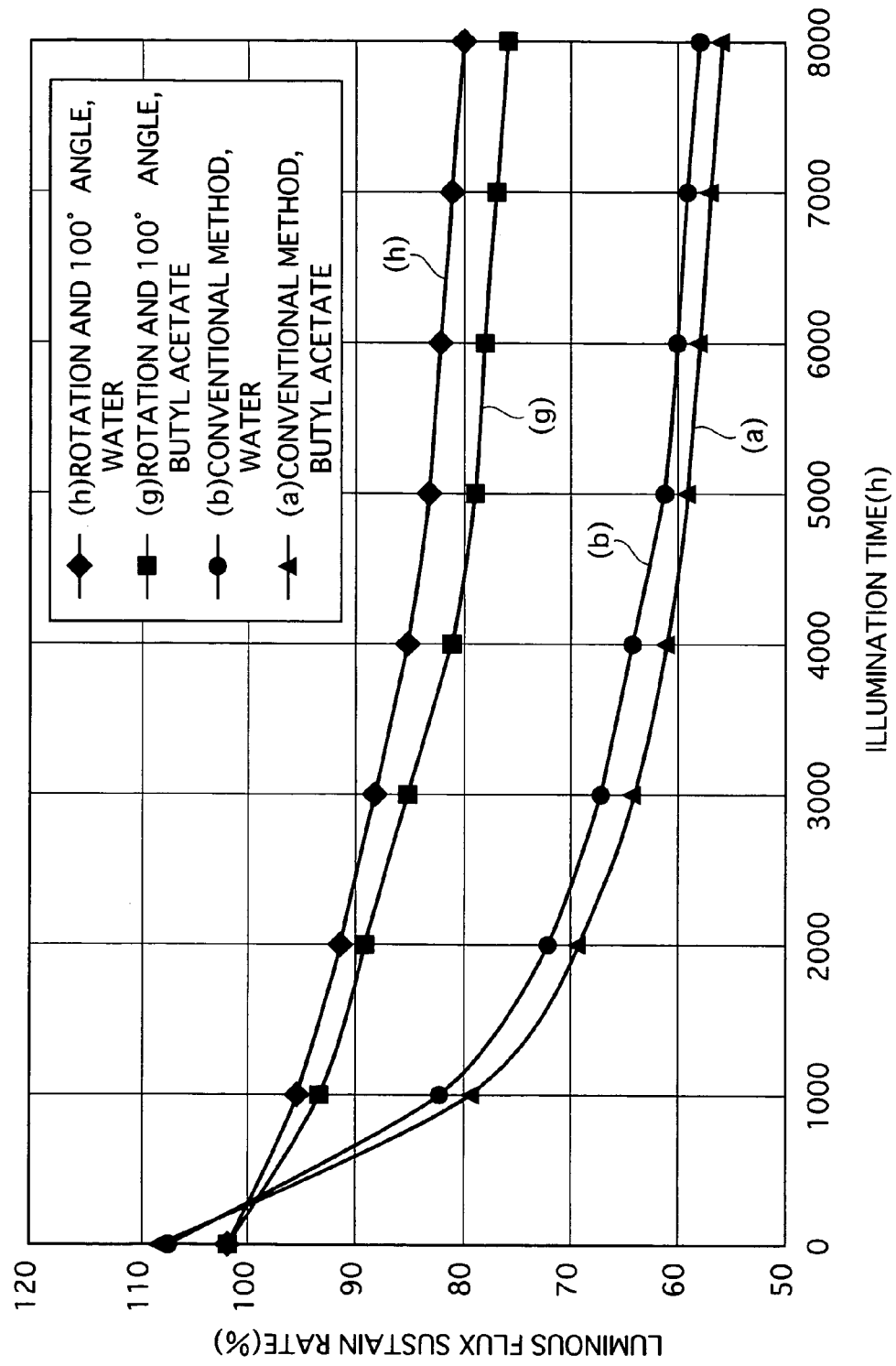
FIG. 14 shows the luminous flux sustain rate of lamps that use an arc tube manufactured according to the first manufacturing method.

FIG. 14 shows the luminous flux sustain characteristics of lamps in which the first invention arc tube is used. FIG. 14 shows results for two types of suspension: a water-based suspension ("h" in the drawing), and a butyl acetate-based suspension ("g" in the drawing). In addition, FIG. 14 shows results for when two types of suspension, i.e., a suspension that uses a water based ("b" in the drawing) and a suspension that uses a butyl acetate base ("a" in the drawing), are used in the conventional method.

The lamps were illuminated under the following conditions:

Voltage applied: 100 V alternating current (frequency 60 Hz)

Temperature during illumination: 25° C.

State of lamp during illumination: base oriented upward

The lamps 1 using the first invention arc tube exhibited improved luminous flux sustain rates over the conventional lamps (conventional arc tubes), regardless of the type of suspension used. In addition, the lamps using the first invention arc tube greatly exceeded the target rated life (6000 hours) of the conventional lamps, achieving a rated life of more than 8000 hours.

Furthermore, the first invention arc tubes exhibited a lower rate of reduction in the luminous flux sustain rate after an illumination time of 4000 hours. In view of these results, rated life can be said to be dramatically improved compared to the conventional lamp.

The luminous flux sustain characteristics of the lamps using the first invention arc tubes are improved over those of the conventional lamps because the described problem of the phosphor layer formed on the inner surface of the tip part side in the cross section of the glass tube being thicker than that on the turning part side of the inner surface is resolved. In other words, the improvement is due to the elimination of inconsistencies in the thickness of the phosphor layer.

Figure 1:
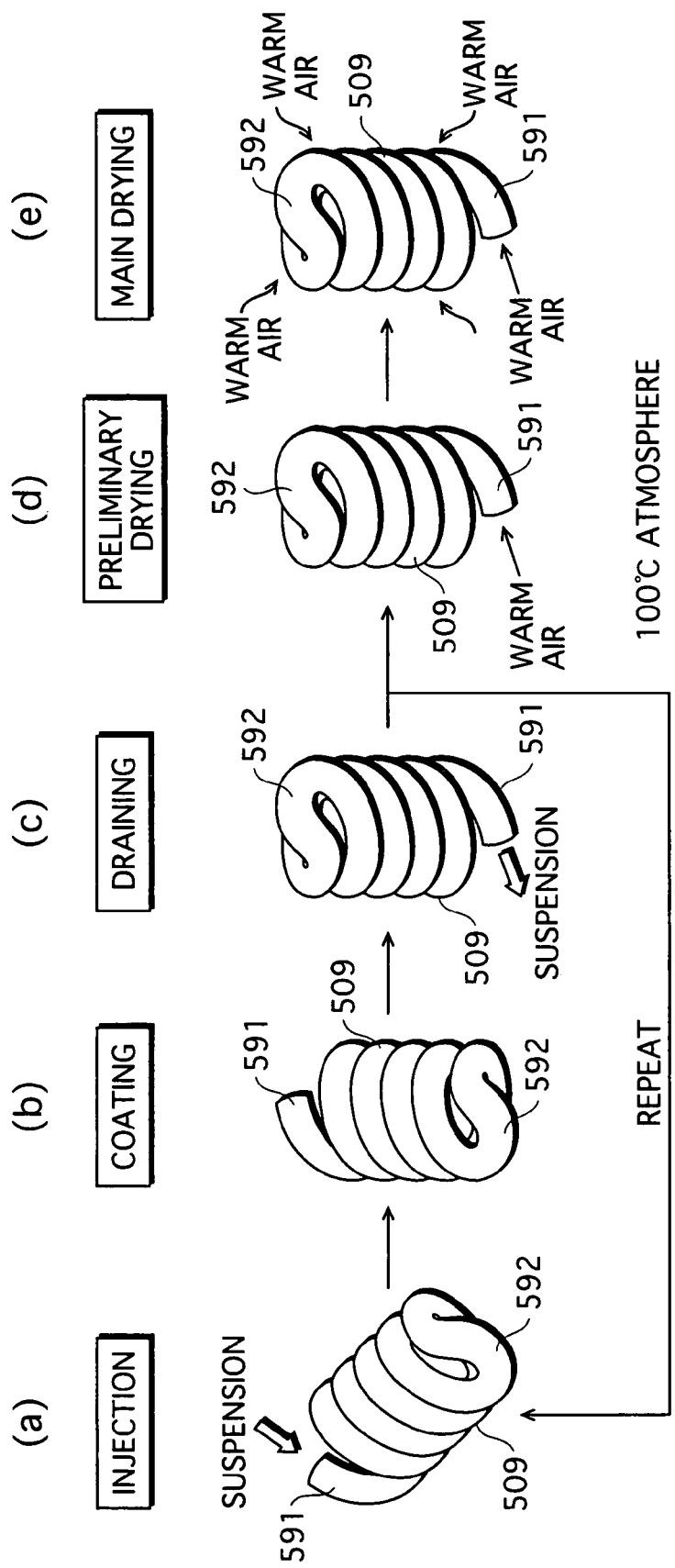
FIG. 1 shows a process for forming a phosphor layer in a double spiral glass tube in a conventional manufacturing method.
Figure 2:
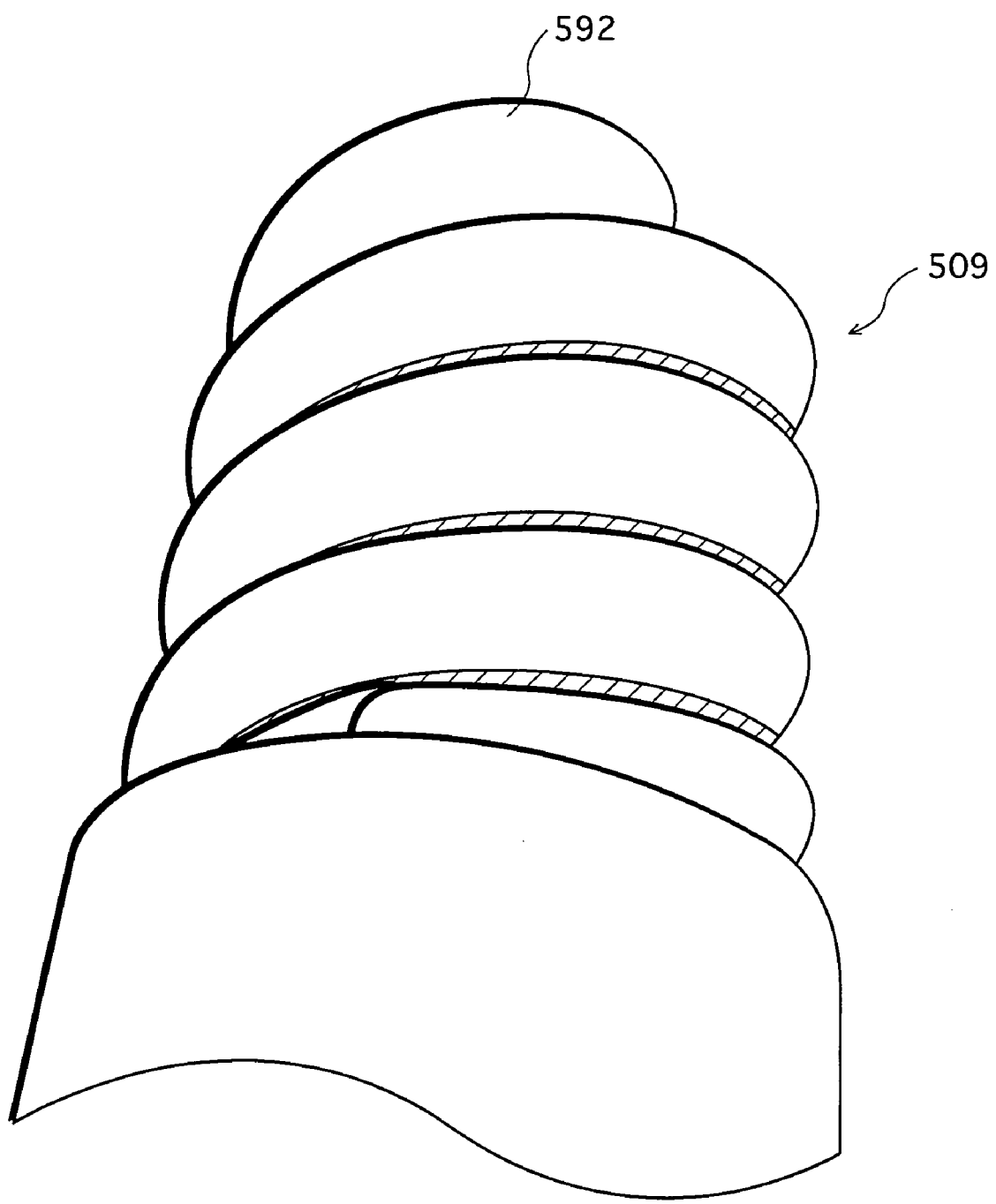
FIG. 2 is a schematic drawing showing a lamp that uses an arc tube manufactured according to a conventional manufacturing method, during illumination.

Specifically, in the conventional phosphor layer formation method, as shown in FIG. 1, the double spiral glass tube 509 is set so that the turning part 592 thereof is substantially at the top, and in this state, the injected suspension is drained as well as preliminary drying being performed. For this reason, the suspension in the double spiral glass tube 509 flows downward on part of the surface that corresponds to the lower side in the cross section, and the phosphor layer is formed thickly on the lower sides in the cross section of the double spiral glass tube 509 that is wound into a spiral shape.

These thickly-formed parts are visible from outside the lamp, and not only detract from the design of the lamp, but also cause impurities such as moisture and carbon in the phosphor layer to remain after drying the coated suspension, because the phosphor layer is thick. These impurities cause bands of blackening in the lamp in these parts when the lamp has been illuminated for some time.

Note that in 100 W lamps which have more turns than 60 W lamps, the unevenness in thickness of the phosphor layer is more noticeable because the length of the glass tube (the distance from the turning part to the tip part) is longer. This phenomenon is thought to further reduce the luminous flux characteristics.

In contrast, since the thickness of the phosphor layer is substantially even in the first invention arc tube, the conventional problem of blackening due to unevenness in thickness is resolved, and this is thought to improve the reduction in the luminous flux. Furthermore, luminous flux sustain characteristics are thought to be improved due to the evenness in thickness of the phosphor layer even when the length of the glass tube (the length from the turning part to the tip part) is longer, as in a 100 W lamp that has more turns than a 60 W lamps.

Second Embodiment

In the arc tube manufacturing method of the first embodiment, and in particular in the draining process when forming the phosphor layer in double spiral glass that composes the arc tube, the double spiral glass tube in inclined so that the spiral axis A thereof is at 45 degrees with respect to the vertical axis V, and in the preliminary drying process the glass tube 100 is inclined so that the spiral axis A is at 100 degrees with respect to the vertical axis V. In contrast, in the present embodiment, the arc tube is manufactured with different angles of inclination in the draining process and the preliminary drying process. The following describes this manufacturing method, and the performance of lamps in which arc tubes manufactured according to the manufacturing method are used.

1. Phosphor Layer Formation Method

Figure 15:
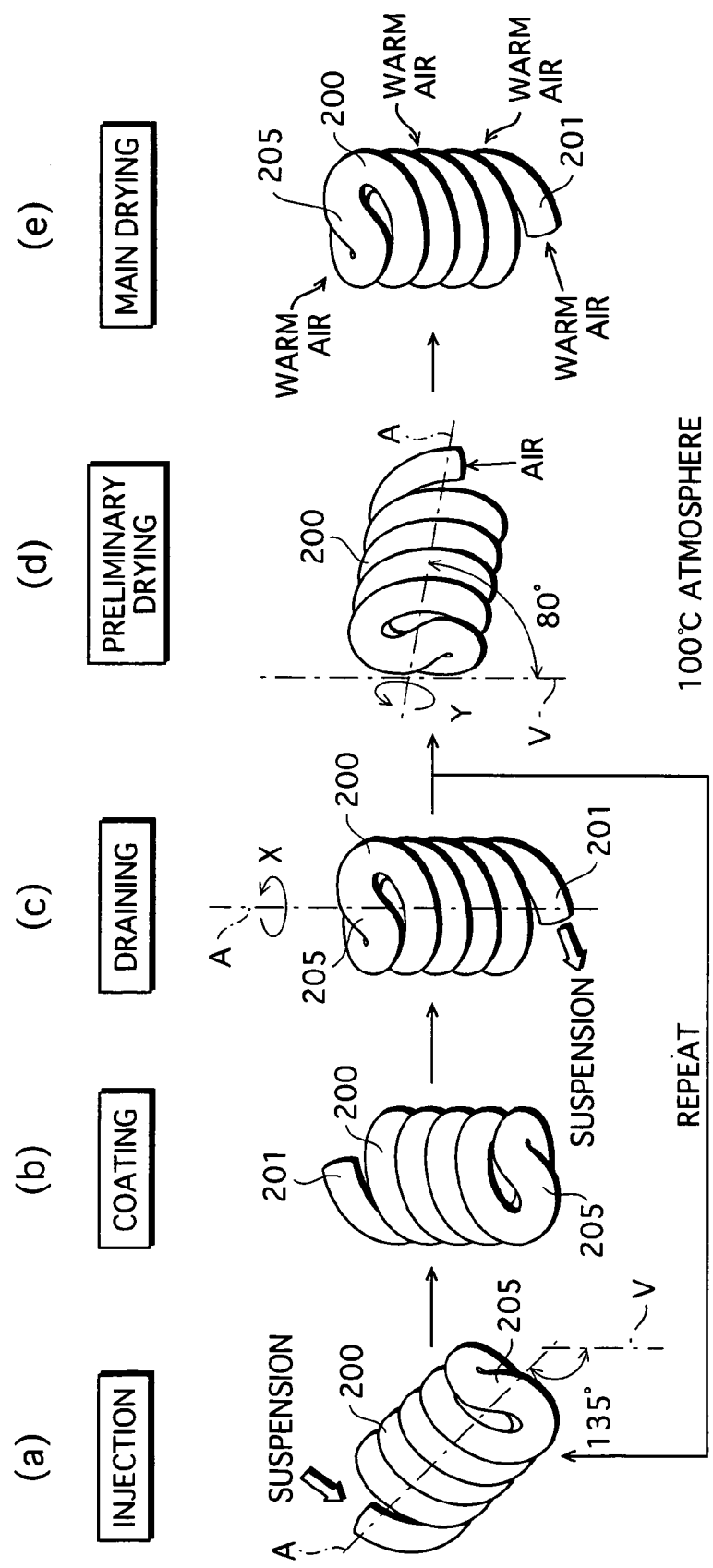
FIG. 15 shows processing for forming the phosphor layer in a second manufacturing method.

FIG. 15 shows the phosphor layer formation method of the second embodiment. The following describes the method for forming the phosphor layer on the inner surface of the double spiral glass tube 200 wound into a double spiral. Note that the injection process for injecting suspension in the double spiral glass tube 200, the coating process for coating the inner surface of the double spiral glass tube 200 with the suspension, and the main drying process for drying the suspension completely are the same as in the first embodiment, and therefore descriptions thereof are omitted here.

(1) Draining Process

When the suspension flowing downward in the double spiral glass tube 200 in the coating process reaches the turning part 205 of the double spiral glass tube 200, the double spiral glass tube 200 is turned upside down so that the spiral axis A thereof is substantially parallel to the vertical axis V and the turning part 205 is at the top. Next, while in this state, the double spiral glass tube 200 is rotated in the X direction, with the spiral axis A as the axis of rotation, thereby draining (discharging) the injected suspension from the double spiral glass tube 200 through the end part 201.

Note that the rotation direction and speed of the double spiral glass tube 200 in the draining process are the same as in the first embodiment, as are the reasons therefor. Furthermore, it is sufficient for the draining time to be in a range of 20 seconds to 40 seconds. This time is shorter than in the first embodiment because the double spiral glass tube 200 is set more vertical in the draining process in the present embodiment than the double spiral glass tube 100 in the first embodiment, and therefore the suspension takes slightly less time to drain.

When discharging of the suspension from the double spiral glass tube 200 through one of the end parts 201 as described has finished, the double spiral glass tube 200 is once again set in a position such as that shown in FIG. 15(*a*), suspension (10 cc) is injected through the other end part, and the coating process and the draining process are performed. As a result, the whole of the inner surface of the double spiral glass tube 200 is coated with suspension.

(2) Preliminary Drying Process

When the inner surface of the double spiral glass tube 200 has been coated with the suspension according to the draining process, the double spiral glass tube 200 is inclined so that the angle between the spiral axis A of the double spiral glass tube 200 and the vertical axis V is 80 degrees, and so that the end part 201 is at the bottom. In this state, the double spiral glass tube 200 is continuously rotated with the spiral axis A as the axis of rotation, at a speed of approximately 3.5 turns per minute. This takes place in an atmosphere of 100° C., and a gas such as air is blown into the double spiral glass tube 200 through the end part 201 during the rotation.

When the suspension in the double spiral glass tube 200 is dried in this way, due to the rotation of the double spiral glass tube 200 while the spiral axis A is inclined at 80 degrees with respect to the vertical axis V, the suspension coats the inner surface evenly because even if excess suspension is left in the low position of the spiral part of each turn, the suspension flows down along the inner surface when the double spiral glass tube 200 is rotated and the low position becomes a high position. Since the preliminary drying is performed with the phosphor evenly coating the inner surface, the phosphor layer is formed evenly. Note that the temperature of the outer surface, and the gas blown into the double spiral glass tube, 200 are the same as described in the first embodiment.

2. Appearance of the Arc Tube

A visual inspection of an arc tube manufactured according to the described method (hereinafter this arc tube is called the "second invention arc tube") detected none of the bands of thickly-formed parts that are found in conventional arc tubes, and therefore the phosphor layer is assumed to have been formed evenly, as with the arc tube manufactured according to the first manufacturing method.

Furthermore, as with the lamp in which the first invention arc tube is used, when a lamp in which the second invention arc tube is used is illuminated, the second invention arc tube has an appearance of even light being emitted from the arc tube, and the lamp does not exhibit the shadow caused by thickly-formed parts in a conventional arc tube. Therefore, the illuminated lamp 1 can be said to have improved design over a conventional lamp.

3. Rated Life of the Lamp

Figure 16:
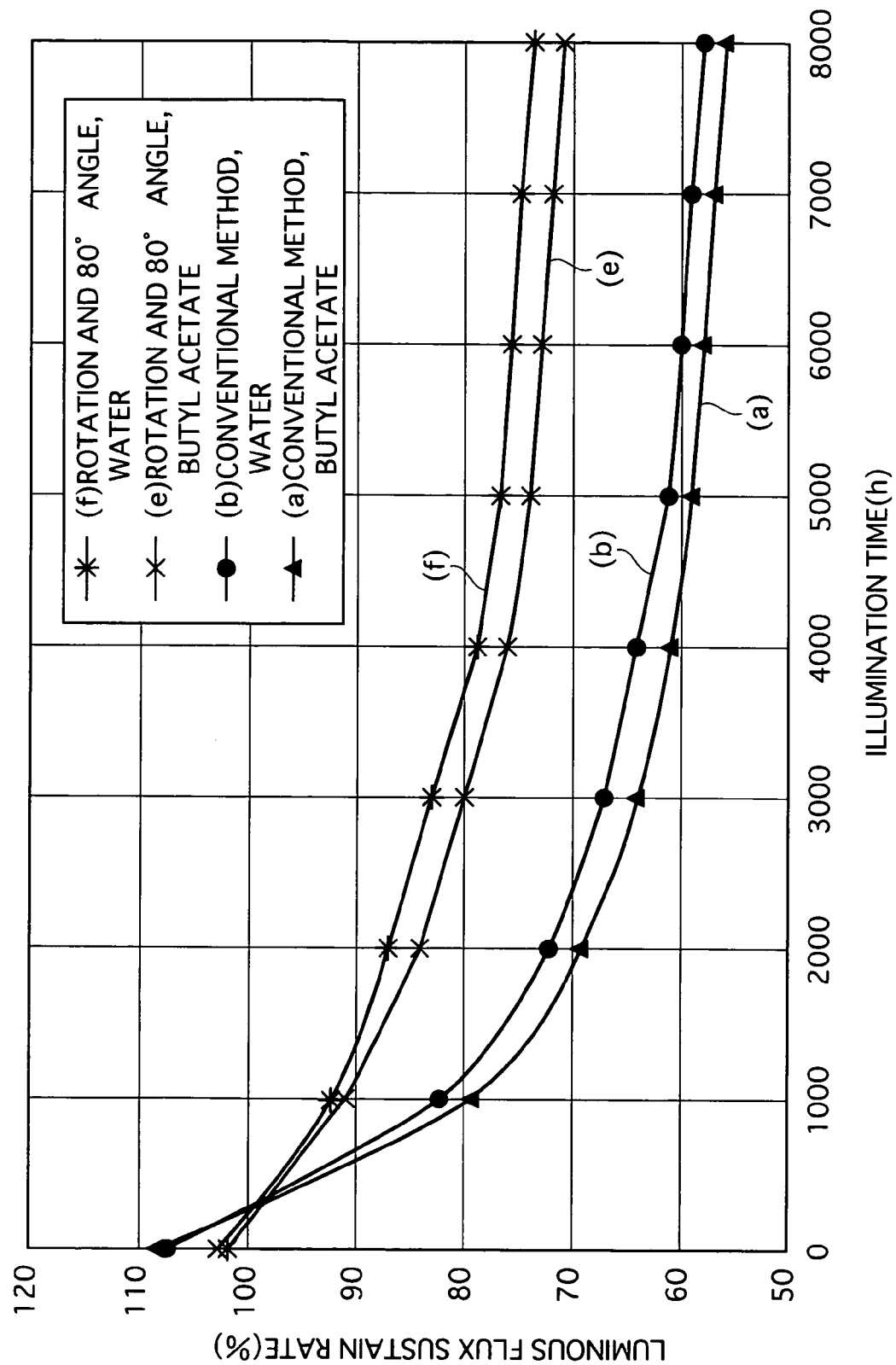
FIG. 16 shows the luminous flux sustain rate of lamps that use an arc tube manufactured according to the second manufacturing method.

FIG. 16 shows luminous flux sustain characteristics of lamps that use the second invention arc tube. FIG. 14 shows results for two types of suspension: a water-based suspension ("f" in the drawing), and a butyl acetate-based suspension ("e" in the drawing). In addition, FIG. 14 shows results for when two types of suspension, i.e., a water-based suspension ("b" in the drawing) and a butyl acetate-based suspension ("a" in the drawing), are used in the conventional method. Note that the lamp illumination conditions are as described in the first embodiment.

The lamps in which the phosphor layer is formed using the second manufacturing method exhibited improved luminous flux sustain rates over the conventional arc tubes, regardless of the type of suspension used. In addition, the lamps in which the second invention arc tube is used greatly exceeded the target rated life (6000 hours) of the conventional lamps, achieving a rated life of more than 8000 hours. Note that the reason for the luminous flux characteristics being improved compared to the conventional lamps is, as described in the first embodiment, thought to be because of the reduction in inconsistency in the thickness of the phosphor layer.

Other Remarks

In the preliminary drying process in each of the embodiments, the double spiral glass tubes 100 and 200 are inclined so that the spiral axis A is at 110° and 80°, respectively, to the vertical axis V, and rotated in this state with the spiral axis A as the axis of rotation. However, the following describes preliminary drying by rotating the double spiral glass tube, but without inclining the double spiral glass tube.

Other than the preliminary drying process, the manufacturing method described here is the same as the first manufacturing method of the first embodiment. Furthermore, the preliminary drying process differs only in the fact that the double spiral glass tube is not inclined, and therefore is not described here.

The luminous flux sustain rate of lamps that use an arc tube manufactured without the double spiral glass tube being inclined in the preliminary drying process was measured in the same was as in the embodiments. Note that although thickly-formed bands were not observed to the same degree as in the arc tube manufactured according to the conventional method, they were more noticeable than in the arc tube formed according to the method of the first embodiment.

Figure 17:
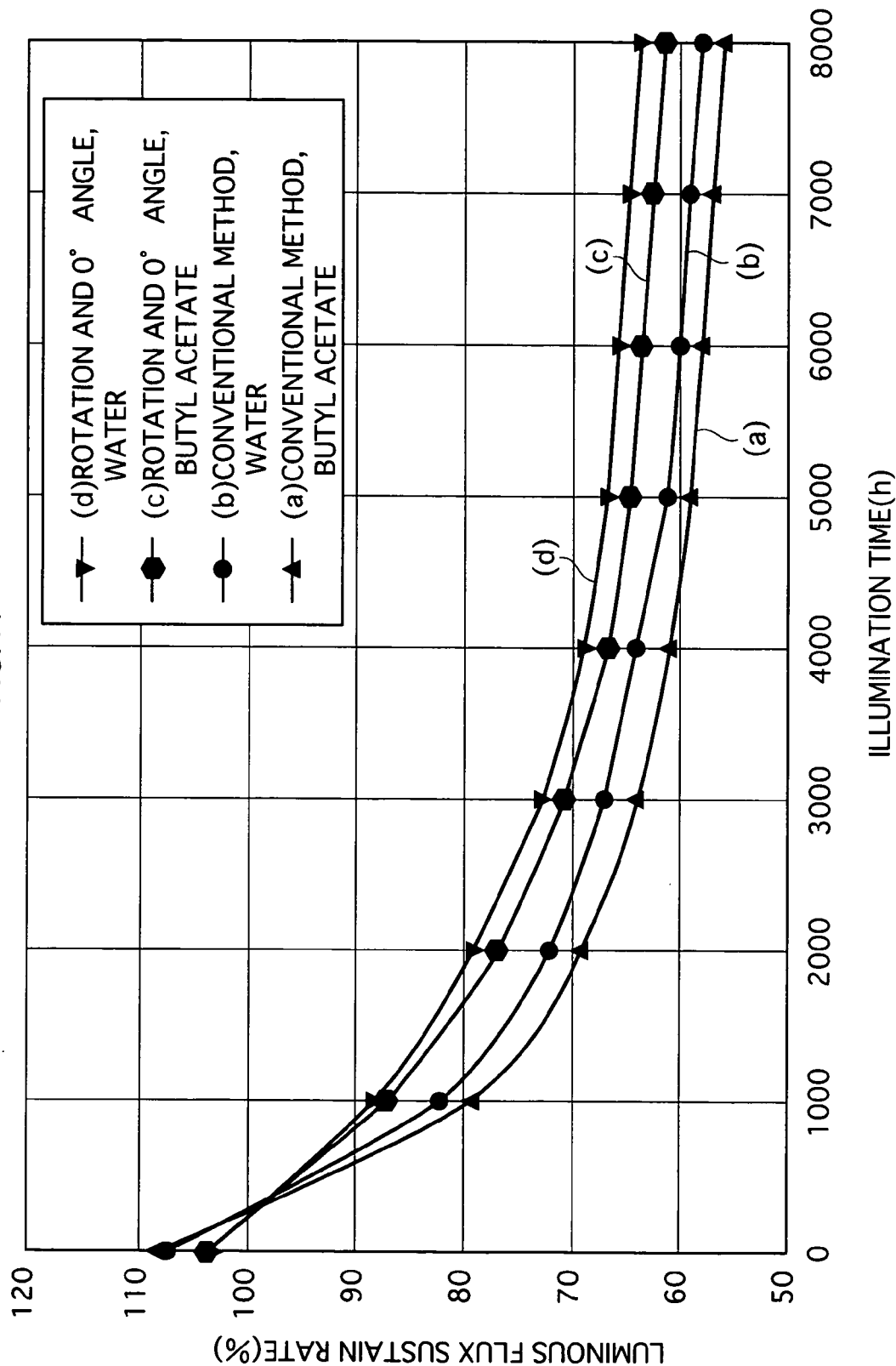
FIG. 17 shows the luminous flux sustain rate of a lamp that uses an arc tube in which the phosphor layer is formed by rotating the double spiral glass tube without inclining the double spiral glass tube.

FIG. 17 shows luminous flux characteristics of the lamps that use an arc tube manufactured according to the aforementioned method. FIG. 17 shows results for two types of suspension: a water-based suspension ("d" in the drawing), and a butyl acetate-based suspension ("c" in the drawing). In addition, FIG. 17 shows results for when two types of suspension, i.e., a water-based suspension ("b" in the drawing) and a butyl acetate-based suspension ("a" in the drawing), are used in the conventional method. Note that the lamp illumination conditions are as described in the first embodiment.

The lamps using an arc tube in which the phosphor layer was formed without inclining exhibited improved luminous flux sustain rates over the conventional arc tubes, regardless of the type of suspension used, but they are inferior to the lamps that use the first invention arc tube and the second invention arc tube.

Figure 18:
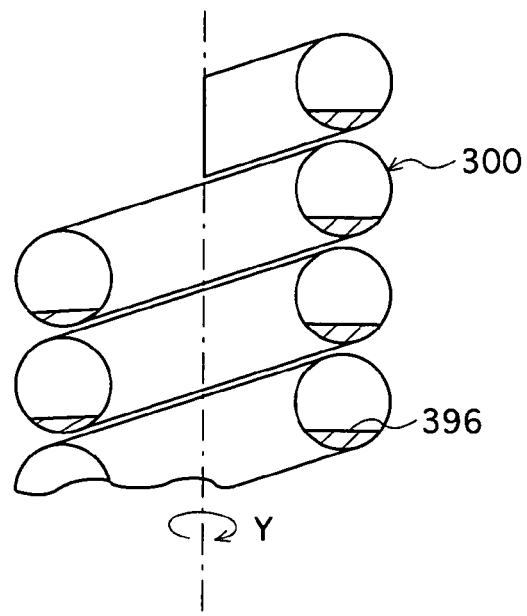
FIG. 18 is a schematic drawing showing fluidity of suspension remaining inside a double spiral glass tube when forming the phosphor layer of the double spiral glass tube formed according to the conventional manufacturing method.

The following describes the flow of the suspension inside the double spiral glass tube when the double spiral glass tube is rotated on the spiral axis without being inclined. FIG. 18 shows the flow of the suspension inside a double spiral glass tube 300 schematically.

The double spiral glass tube 300 in FIG. 18 in a state in which the turning part is at the top has been cut in a vertical direction. As is clear from the drawing, suspension 396 accumulates at in lower parts of the glass tubes in the cross section of the double spiral glass tube 300. In addition, even if the double spiral glass tube 300 is rotated in the Y direction in a state in which it is not inclined, the suspension remains accumulated in the same place. For this reason, the double spiral glass tube 300 is dried while the suspension remains accumulated in the lower parts of the cross section, and therefore thickly-formed parts are formed as in the conventional double spiral glass tube.

Note that increasing the rotation speed causes the suspension in the double spiral glass tube to move towards the outside due to centrifugal force. However, if the increased speed in maintained, the phosphor layer is formed thickly on the inner surface of the double spiral glass tube, resulting in thickly-formed parts formed in the same way as in the conventional double spiral glass tube.

The inconsistent thickness of the phosphor layer in the double spiral glass tube 300 is thought to be improved to an extent over the conventional double spiral glass tube because rotating the double spiral glass tube 300 in the standing state (i.e., while not inclined) forcedly discharges the suspension accumulated in the double spiral glass tube 300. This is thought to be the reason for the luminous flux sustain rate being slightly higher than that of the conventional lamps.

These results suggest that in the first and second manufacturing methods the suspension flows in the double spiral glass tubes 100 and 200 due to the rotation as shown in FIGS. 8A and 8B (for the case of a 100 degree angle) because the double spiral glass tubes 100 and 200 are inclined with angles of 100 degrees and 80 degrees, respectively, between the spiral axis A and the vertical axis V in the preliminary drying process. However, in the present method in which the double spiral glass tube is not inclined, the flow of the suspension is reduced compared to the first and second manufacturing methods. This is thought to be the reason that the phosphor thickness inconsistencies are less apparent than in the conventional arc tube, but more marked than in the first and second invention arc tubes.

Consequently, based on the luminous flux sustain characteristics of the lamps using the arc tubes manufactured according to the first, second and present manufacturing methods, it can be seen that while rotation alone of the double spiral glass tube in the preliminary drying process provides an improved product, the effect of doing so is relatively insignificant. For this reason, the present invention is characterized by inclining and rotating the double spiral glass tube to obtain a remarkable effect in comparison to the conventional arc tube.

Modifications

Although the present invention has been described based on the preferred embodiments, the present invention is not limited to these embodiments. The following are examples of modifications of the present invention.

(1) Formation of the Phosphor Layer a. In the described embodiments, the suspension coated on the inner-surface of the double spiral glass tube is dried according to two processes: the preliminary drying process and the main drying process. However, these two processes may be performed according to one drying process. For example, the main drying may be carried out by extending the preliminary drying time from seven minutes to fifteen minutes. In this case, it is necessary to rotate the double spiral glass tube at least until the solution no longer flows according to self weight. Once the solution has stopped flowing, the double spiral glass tube may or may not be rotated.

b. Inclining the Double Spiral Glass Tube during the Preliminary Drying Process

In the described preferred embodiments, the double spiral glass tube is rotated at one type of set angle (100 degrees in the first embodiment and 80 degrees in the second embodiment) in the preliminary drying process. However, it is possible to incline the double spiral glass tube at two or more different angles during the preliminary drying process. For example, the angle between the spiral axis and the vertical axis may be held at 100 degrees at the start of rotating and then changed to a different angle after a predetermined amount of time has lapsed. Furthermore, the angle of inclination may be changed either continuously or intermittently within a predetermined range.

c. Rotation of the Double Spiral Glass Tube during Preliminary Drying

In the described preferred embodiments, the double spiral glass tube is rotated at one type of set speed (3.5 rotations/minute) in the preliminary drying process. However, it is possible to rotate the double spiral glass tube at two or more different speeds during the preliminary drying process. By increasing the rotation speed, the position of suspension flowing downward due to gravity can be changed due to the effects of centrifugal force. Specifically, rotation may be started at a speed of two rotations per minute, and then changed to a speed of ten rotations per minute after a predetermined amount of time has lapsed. Furthermore, changes in speed may be made either in stages or continuously.

e. Angle of Inclination of the Double Spiral Glass Tube during Preliminary Drying In the first and second embodiments the angle of inclination of the double spiral glass tube during preliminary drying is such that the spiral axis is at 100 degrees or 80 degrees with respect to the vertical axis. However, the angle of inclination may be such that the angle between the spiral axis and the vertical axis is in a range of 45 degrees to 150 degrees inclusive. The reasons for this are as follows.

Figure 19:
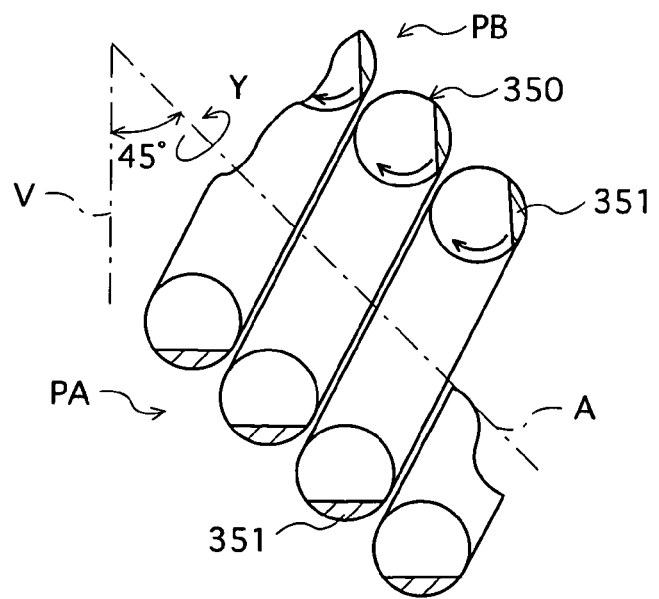
FIG. 19 is a schematic drawing showing fluidity of suspension remaining inside the double spiral glass tube when forming the phosphor layer of the double spiral glass tube by inclining the spiral axis at 45 degrees with respect to the vertical axis.

FIG. 19 shows schematically the flow of suspension on the inner surface of the double spiral glass tube when the double spiral glass tube is rotated at a 45 degree angle of inclination. A double spiral glass tube 350 shown in FIG. 19 is cut in a vertical direction that passes through the spiral axis. As shown in FIG. 19, suspension 351 accumulated at a lowest position PA in the double spiral glass tube 350 reaches a highest position PB on the inner surface by rotating the double spiral glass tube 350 in the Y direction.

The suspension 351 that is in the position at the top side in the cross section of each glass tube 350 flows downward in the spiral direction. Here, in reaching the top position PB, the suspension 351 flows not only in the spiral direction, but also in a direction from top to bottom (shown by the arrows in FIG. 19).

Accordingly, even if the suspension 351 accumulates excessively at the low positions PA of the double spiral glass tube 350, when the suspension next reaches the high positions PB due to the rotation of the double spiral glass tube 350, the suspension flows downward also in a different direction to the direction in which the suspension flowed to reach the high positions PB, and therefore coats the inner surface of the double spiral glass tube 350 thinly. Consequently, inconsistent thickness of the phosphor layer can be avoided if the double spiral glass tube is inclined even slightly so that the suspension flows downward in a different direction to the direction in which the suspension flowed to reach the high positions PB. However, as described the angle between the spiral axis and the vertical axis should be within a range of 45 degrees to 150 degrees in order to be effective in reducing inconsistencies in. thickness.

Note that even when the angle between the spiral axis and the vertical axis is 150 degrees, the suspension flows in the same way and the phosphor layer is formed evenly on the inner surface of the double spiral glass tube.

(2) Globe

Although the lamp in the described embodiments does not have a globe covering the arc tube, the lamp may be provided with a globe. It should be noted that since heat is accumulated in the globe during illumination, the temperature of the arc tube during illumination tends to be higher in a lamp that has a globe than one that does not.

Figure 20:
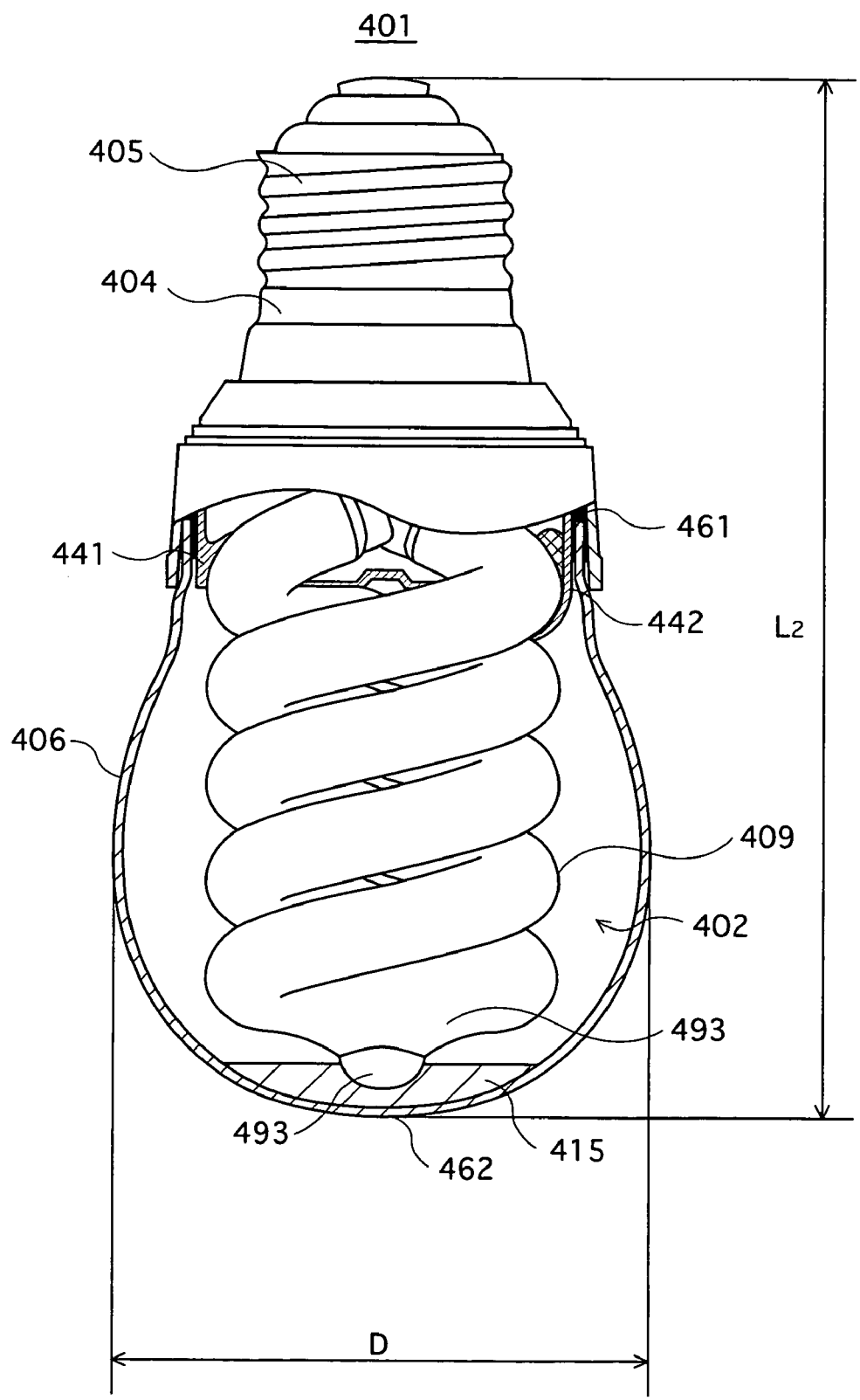
FIG. 20 is a front view showing a lamp in a modification of the first embodiment of the present invention.

FIG. 20 is a front view of a partially cut-away lamp enclosed in a globe. This lamp 401 includes an arc tube 402 that is mounted in a holder 441 and covered by a globe 406.

The globe 406 is interpolated in a case 404 at an opening side of the globe 406, and an outer periphery of an end part of the globe 406 on the opening side is fixed to an inner periphery of an end part of the case 404 at an opening side of the case 404. Note that the lamp has a maximum outside diameter D of approximately 55 mm a length of approximately 114 mm.

Similar to an incandescent lamp, the globe 406 is made of a decorative glass, and has an "A" shape. The inner surface of the globe 406 is coated with a diffusing film (not illustrated) for diffusing light from the arc tube 2. The diffusing film is made using, for example, a powder whose main component is calcium carbonate.

A heat conductive medium 415 that is made of silicon resin and conveys heat form the arc tube 402 to the globe 406 during illumination is provided at a bottom tip part inside the globe 406. A protrusion 493 of the arc tube 402 is embedded in the heat conductive medium 415, thereby thermally joining the arc tube 402 and the globe 406 via the heat conductive medium 415.

(3) Shape of the Bent Glass (Arc Tube)

In the above-described embodiments, the arc tube is bent at the turning part, and both sides therefrom are made to wind around an axis, up to the corresponding ends of the glass tube, so as to be formed as a double spiral configuration on the whole. However, the arc tube may take other shapes, including a shape that the glass tube constituting the arc tube is wound around an axis from its turning part to only one end of the glass tube, so as to be formed as a single spiral configuration. Alternatively, in the glass tube formed as the same double spiral configuration which is wound around an axis from the turning part to both ends of the glass tube, these ends of the glass tube may be arranged to run in substantially the spiral axis direction.

The manufacturing method of the above-described embodiments reduces inconsistencies in the phosphor layer thickness even when used for bent glass having a shape other than a double spiral shape.

(4) Other

Although the present invention is described as being a substitute for a 60 W incandescent lamp, the present invention may be applied to a substitute for a 40 W incandescent lamp or a substitute for a 100 W incandescent lamp. Furthermore, although the present invention is described in the embodiments as being applied to a compact self-ballasted fluorescent lamp that has a double-spiral arc tube, the present invention may be applied to, for example, a fluorescent lamp that does not include an electronic ballast.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A manufacturing method for an arc tube in which a phosphor layer is formed on an inner surface of a bent glass tube, comprising:
    a formation process of turning a glass tube to form a turning part therein, and winding the glass tube, from the turning part to at least one end of the glass tube, on a predetermined axis in a first direction, thereby forming the bent glass tube;
    a coating process of coating the inner surface of the bend glass with a phosphor suspension; and
    a preliminary drying process of drying the phosphor suspension that coats the inner surface, while rotating the bent glass tube on the axis in a second direction that is opposite to the first direction, with the bent glass tube in an inclined state such that the axis is inclined with respect to a vertical direction.

2. The arc tube manufacturing method of claim 1, wherein in the preliminary drying process, the suspension is dried until the suspension no longer flows according to self weight.

3. The arc tube manufacturing method of claim 1, wherein in the preliminary drying process the bent glass tube is inclined such that an angle between the axis and the vertical direction is in a range of 45 degrees to 150 degrees inclusive.

4. The arc tube manufacturing method of claim 1, wherein the glass tube is wound, from the turning part to each end, on the axis in the first direction, thereby forming the bent glass tube having a double spiral shape.

5. The arc tube manufacturing method of claim 4, wherein in the preliminary drying process the bent glass tube is inclined such that an angle between the axis and the vertical direction is in a range of 90 degrees to 150 degrees inclusive.

6. The arc tube manufacturing method of claim 1, wherein the suspension has a viscosity in a range of $3.0*10^{-3}$ Pas to $5.0*10^{-3}$ Pas inclusive.

7. The arc tube manufacturing method of claim 1, wherein the bent glass tube is rotated in a range of 2 rotations/min to 20 rotations/min inclusive.

8. The arc tube manufacturing method of claim 1, wherein when the suspension is being injected into the bent glass tube, a temperature of an outer surface of the glass tube is in a range of 30° C. to 60° C. inclusive.

9. The arc tube manufacturing method of claim 1, wherein a draining process is performed before the preliminary drying process, the draining process being for draining the suspension out from the bent glass tube through an end part thereof by gravity.

10. The arc tube manufacturing method of claim 9, wherein
in the draining process the bent glass tube is rotated at a speed in a range of 2 rotations/min to 20 rotations/min, an axis of rotation being the spiral axis.

11. The arc tube manufacturing method of claim 10, wherein
in the draining process the bent glass tube is rotated for at least 15 seconds and no more than 60 seconds from when draining of the suspension is commenced.

12. The arc tube manufacturing method of claim 10, wherein
in the draining process the bent glass tube is rotated inclined with respect to the vertical direction.

13. The arc tube manufacturing method of claim 12, wherein
the bent glass tube is inclined at an angle in a range of 5 degrees to 90 degrees inclusive.

14. The arc tube manufacturing method of claim 1, wherein
the suspension is water based, and includes phosphor for three bands.

15. The arc tube manufacturing method of claim 1, wherein
the suspension is butyl acetate based, and includes phosphor for three bands.

* * * * *